United States Patent
Iwatsuki et al.

(10) Patent No.: US 7,496,435 B2
(45) Date of Patent: Feb. 24, 2009

(54) DRIVE CONTROL SYSTEM FOR ELECTRIC VEHICLE AND METHOD OF DRIVE CONTROL OF ELECTRIC VEHICLE

(75) Inventors: Ken Iwatsuki, Aichi-ken (JP); Masaki Nomura, Aichi-ken (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 474 days.

(21) Appl. No.: 11/002,337

(22) Filed: Dec. 3, 2004

(65) Prior Publication Data
US 2005/0159861 A1    Jul. 21, 2005

(30) Foreign Application Priority Data
Jan. 21, 2004 (JP) .............................. 2004-012931

(51) Int. Cl.
*B60L 19/00* (2006.01)
*B60L 11/00* (2006.01)

(52) U.S. Cl. ................. 701/22; 701/41; 477/3; 477/182; 477/189; 477/190; 180/65.2; 192/215

(58) Field of Classification Search .......... 701/22, 701/213, 41, 84; 345/30; 180/197, 65.2; 318/432; 477/3, 182, 189–192; 192/215, 192/219.1; 123/179.4
See application file for complete search history.

(56) References Cited

U.S. PATENT DOCUMENTS

| | | | | |
|---|---|---|---|---|
| 5,117,931 A * | 6/1992 | Nishida | ..................... | 180/65.2 |
| 5,258,651 A * | 11/1993 | Sherman | ..................... | 290/23 |
| 5,285,111 A * | 2/1994 | Sherman | ..................... | 290/4 C |
| 5,343,970 A * | 9/1994 | Severinsky | ................. | 180/65.2 |
| 5,396,968 A | 3/1995 | Hasebe et al. | | |
| 5,697,466 A * | 12/1997 | Moroto et al. | ............. | 180/65.2 |
| 5,887,670 A * | 3/1999 | Tabata et al. | ............... | 180/65.2 |
| 6,209,672 B1 * | 4/2001 | Severinsky | ................ | 180/65.2 |
| 6,269,895 B1 * | 8/2001 | Tanuguchi et al. | ......... | 180/65.2 |
| 6,278,916 B1 * | 8/2001 | Crombez | .................... | 701/22 |

(Continued)

FOREIGN PATENT DOCUMENTS

CN    1899900 A  *  1/2007

(Continued)

OTHER PUBLICATIONS

New natural observer applied to speed-sensorless DC servo and induction motors; Bowes, S.R.; Sevinc, A.; Holliday, D.; Industrial Electronics, IEEE Transactions on; vol. 51, Issue 5, Oct. 2004 pp. 1025-1032; Digital Object Identifier 10.1109/TIE.2004.834963.*

(Continued)

*Primary Examiner*—Cuong H Nguyen
(74) *Attorney, Agent, or Firm*—Sughrue Mion, PLLC

(57) ABSTRACT

A drive control system for an electric vehicle and a method of drive control of the electric vehicle. The drive control system for the electric vehicle includes a drive motor target torque calculation processing device for calculating a drive motor target torque representing a target torque of a drive motor; and a drive motor target torque restriction processing device that judges whether or not a parking mechanism is in operation and, if the parking mechanism is in operation, restricts variations in the drive motor target torque.

15 Claims, 15 Drawing Sheets

U.S. PATENT DOCUMENTS

| | | | |
|---|---|---|---|
| 6,338,391 B1 * | 1/2002 | Severinsky et al. | 180/65.2 |
| 6,377,007 B1 * | 4/2002 | Ozaki et al. | 318/432 |
| 6,494,801 B1 * | 12/2002 | Ohtake et al. | 475/5 |
| 6,554,088 B2 * | 4/2003 | Severinsky et al. | 180/65.2 |
| 6,558,289 B2 * | 5/2003 | Chung | 477/3 |
| 6,634,247 B2 * | 10/2003 | Pels et al. | 74/329 |
| 6,692,394 B2 | 2/2004 | Takenaka | |
| 6,966,866 B2 | 11/2005 | Ando et al. | |
| 7,090,612 B2 * | 8/2006 | Ozeki et al. | 477/3 |
| 7,104,347 B2 * | 9/2006 | Severinsky et al. | 180/65.2 |
| 7,151,987 B2 * | 12/2006 | Tobler et al. | 701/22 |
| 7,152,707 B2 * | 12/2006 | Matsuda | 180/243 |
| 7,237,634 B2 * | 7/2007 | Severinsky et al. | 180/65.2 |
| 7,392,871 B2 * | 7/2008 | Severinsky et al. | 180/65.2 |
| 2002/0116101 A1 * | 8/2002 | Hashiba et al. | 701/22 |
| 2003/0130772 A1 | 7/2003 | Yanagida et al. | |
| 2005/0159861 A1 * | 7/2005 | Iwatsuki et al. | 701/22 |
| 2008/0243339 A1 * | 10/2008 | Nishimori et al. | 701/41 |

FOREIGN PATENT DOCUMENTS

| | | | |
|---|---|---|---|
| DE | 10260680 A1 | | 8/2003 |
| EP | 96468 A | * | 12/1983 |
| EP | 148558 A | * | 7/1985 |
| EP | 148558 A2 | * | 7/1985 |
| EP | 20040290031 | * | 7/2004 |
| JP | 0444910 | * | 10/1991 |
| JP | 5-278483 A | | 10/1993 |
| JP | 181461 | * | 7/1995 |
| JP | 407277157 A | * | 10/1995 |
| JP | 2001-355727 A | | 12/2001 |
| JP | 2003-24738 A | | 9/2003 |

OTHER PUBLICATIONS

Field oriented control of a high power GTO-VSI fed AC drive with high dynamic performance using a programmable high speed controller (PHSC)Steinke, J.K.; Dudler, G.J.; Huber, B.P.; Industry Applications Society Annual Meeting, 1992., Conference Record of the 1992 IEEE; Oct. 4-5, 1992 p. 393-399 vol. 1;Digital Object Identifier 10.1109/IAS.199.*

Sensors for automotive telematics, J D Turner†and L Austin; †Transport Research Laboratory, Crowthorne, Berkshire RG45 6AU, UK; Oxford Brookes University, Headington, Oxford OX3 0BP, UK; Received Jun. 10, 1999, in final form and accepted for publication Nov. 17, 1999.*

* cited by examiner

DRIVE CONTROL SYSTEM FOR ELECTRIC VEHICLE AND METHOD OF DRIVE CONTROL OF ELECTRIC VEHICLE

The disclosure of Japanese Patent Application No. 2004-012931 filed on Jan. 21, 2004, including the specification, drawings and abstract thereof, are incorporated by reference in their entirety.

BACKGROUND OF THE INVENTION

1. Field of the Invention

The present invention relates to a drive control system for an electric vehicle and a method of drive control of an electric vehicle.

2. Description of the Related Art

In the related art, a vehicle drive system mounted to a hybrid vehicle as an electric vehicle and adapted to transmit part of engine torque, which is a torque of an engine, to a generator (a generator motor), and transmit the rest of the engine torque to driving wheels, includes a planetary gear unit having a sun gear, a ring gear, and a carrier, and is configured in such a manner that the carrier and the engine are connected, the ring gear and the drive motor are connected to the driving wheels, and the sun gear and the generator are connected so that rotation outputted from the ring gear and the drive motor is transmitted to the driving wheels to generate drive power.

Then, in the vehicle drive system, an inverter is disposed between the drive motor and a drive motor control unit, the inverter is driven based on a drive signal fed from the drive motor control unit, receives a DC current from a battery, generates U-phase, V-phase, and W-phase currents, and supplies the currents of the respective phases to the drive motor. In order to do so, the inverter includes a plurality of transistors, for example, six transistors, as switching elements, and the transistors, being unitized by pairs, constitute transistor modules, Insulated Gate Bipolar Transistor, (IGBT) in the respective phases. Therefore, when the drive signal is sent to the respective transistors in a predetermined pattern, the transistors are turned ON and OFF and generate currents in the respective phases.

Then, a rotor position which represents a position of a rotor of the drive motor is detected, the drive motor revolution number, which is a revolution number of the drive motor, is calculated based on the rotor position, and control of a drive motor torque, which is a torque of the drive motor for example, is performed based on the drive motor revolution number.

The hybrid vehicle having a structure as described above is adapted in such a manner that a forward travel range, a reverse travel range, a neutral range, and a parking range can be selected by operating a shift lever. When the parking range is selected, the driving wheels are locked, and the hybrid vehicle is maintained in a stopped state (for example, see JP-A-5-278483).

Therefore, the ring gear is integrally formed with a parking gear, so that when a driver operates the shift lever and selects the parking range, a parking mechanism is activated, a swingably disposed clawed pole is brought into engagement with the parking gear to lock the parking gear, whereby the driving wheels are locked.

However, in the hybrid vehicle in the related art, for example, when the engine torque varies because the engine is started or stopped in a state in which the parking mechanism is activated, an abnormal grating sound may be generated between the clawed pole and the parking gear in the parking mechanism.

In other words, when starting the engine in the hybrid vehicle, it is necessary to obtain an engine revolution number, which is a revolution number of the engine, of a value suitable for starting the engine. Therefore, the generator is activated and increases a generator revolution number, which is a revolution number of the generator. At this time, it is necessary to cause a predetermined drive motor torque to be generated by the drive motor corresponding to a generator torque, which is a torque of the generator in order to receive a reaction force generated when rotating the engine. However, when noise is added to a sensor output from a position sensor that detects the rotor position upon driving the drive motor, the drive motor torque cannot be generated with high degree of accuracy, and consequently, the grating sound may occur between claws of the clawed pole and teeth of the parking gear due to backlash.

On the other hand, when stopping the engine of the hybrid vehicle, it is necessary to obtain the engine revolution number of a value suitable for stopping the engine. Therefore, the generator revolution number is reduced to a negative value. At this time, it is necessary to reduce the drive motor torque in association with the decrease in the generator torque. In this case as well, the grating sound may occur.

SUMMARY OF THE INVENTION

The present invention addresses the problems of the hybrid vehicle in the related art as described above, and provides a drive control system for an electric vehicle and a method of drive control of an electric vehicle which can prevent generation of a grating sound when an engine torque varies while the parking gear mechanism is in operation.

Therefore, a drive control system for an electric vehicle consistent with an exemplary embodiment of the invention includes a drive motor target torque calculation processing device for calculating a drive motor target torque representing a target torque of a drive motor, and a drive motor target torque restriction processing device that determines whether or not a parking mechanism provided engageably and disengageably with respect to a drive shaft so as to disable rotation thereof is in operation and, if the parking mechanism is in operation, restricts variations in the drive motor target torque.

In another exemplary drive control system for an electric vehicle of the invention, the drive motor target torque restriction processing device restricts the rate of change of the drive motor target torque.

In still another exemplary drive control system for an electric vehicle of the invention, the drive motor target torque restriction processing device restricts the rate of change of the drive motor target torque so as to be smaller than in a state in which the parking mechanism is not in operation.

An exemplary drive control system for an electric vehicle consistent with an exemplary embodiment of the invention further includes a differential rotator having first to third differential elements wherein the first differential element is connected to a generator, the second differential element is connected to the drive motor, and the third differential element is connected to an engine.

The drive motor target torque restriction processing device is configured in such a manner that a generator revolution number is controlled so that an engine revolution number meets an engine target revolution number, the drive motor target torque is calculated so that a vehicle-demanded torque required for causing the electric vehicle to travel is generated while parallelizing with an engine torque and a generator torque, and variations in the drive motor target torque is restricted when the drive motor is being driven.

An exemplary drive control system for an electric vehicle further includes a vibration restriction processing device that calculates a torque correction value for the drive motor target torque in order to restrict vibrations of a vehicle output shaft of the electric vehicle.

The drive motor target torque restriction processing device restricts the torque correction value.

An exemplary drive control system for an electric vehicle further includes a drive motor angular acceleration calculation processing device for calculating an angular acceleration of the drive motor.

The vibration restriction processing device calculates a torque correction value so that the angular acceleration becomes smaller than a predetermined value.

An exemplary drive control system for an electric vehicle further includes a plurality of detecting units disposed at predetermined positions on a plurality of shafts.

The vibration restriction processing device calculates the torque correction value so that the difference of the revolution number detected by the respective detecting units.

A method of drive control of an electric vehicle of the invention includes calculating a drive motor target torque that represents a target torque of a drive motor, determining whether or not a parking mechanism provided engageably and disengageably with respect to a drive shaft so as to disable rotation thereof is in operation, and, if the parking mechanism is in operation, limiting variations in the drive motor target torque.

Consistent with an exemplary embodiment of the invention, a drive control system for an electric vehicle includes a drive motor target torque calculation processing device for calculating a drive motor target torque representing a target torque of a drive motor, and a drive motor target torque restriction processing device that determines whether or not a parking mechanism provided engageably and disengageably with respect to a drive shaft so as to disable rotation thereof is in operation and, if the parking mechanism is in operation, restricts variations in the drive motor target torque.

In this case, whether or not the parking mechanism is in operation is determined and, if the engine torque varies when the parking mechanism is in operation, variations in the drive motor target torque are restricted, whereby generation of a grating sound in the parking mechanism can be prevented.

DESCRIPTION OF THE EXEMPLARY EMBODIMENTS

Figure 1:
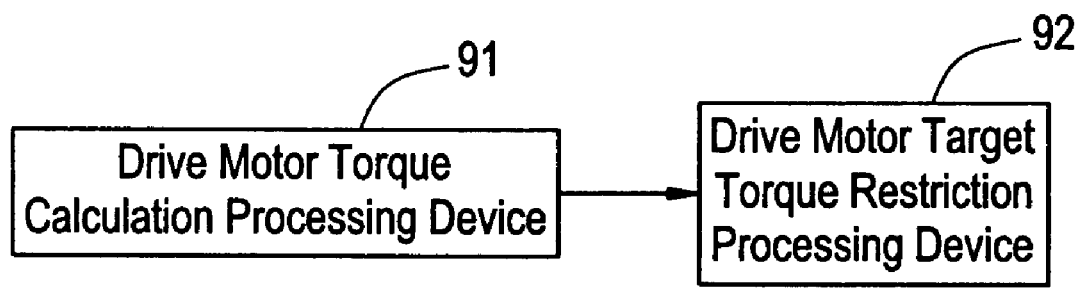
FIG. 1 is a function block diagram of a drive control system for a hybrid vehicle consistent with an exemplary embodiment of the invention.

Referring now to the drawings, exemplary embodiments of the invention will be described in detail. In this case, description will be made about a hybrid vehicle as an electric vehicle, and a drive control system for a hybrid vehicle as a drive control system for an electric vehicle.

FIG. 1 is a function block diagram of a drive control system for a hybrid vehicle consistent with an exemplary embodiment of the invention.

In the drawing, reference numeral 91 designates a drive motor target torque calculation processing device for calculating a drive motor target torque representing a target torque of a drive motor, and reference numeral 92 designates a drive motor target torque restriction processing device for determining whether or not a parking mechanism disposed engageably and disengageably with a drive shaft so as to disable rotation of the drive shaft, is in operation and, if the parking mechanism is in operation, restricting variations in the drive motor target torque.

Subsequently, the hybrid vehicle will be described.

Figure 2:
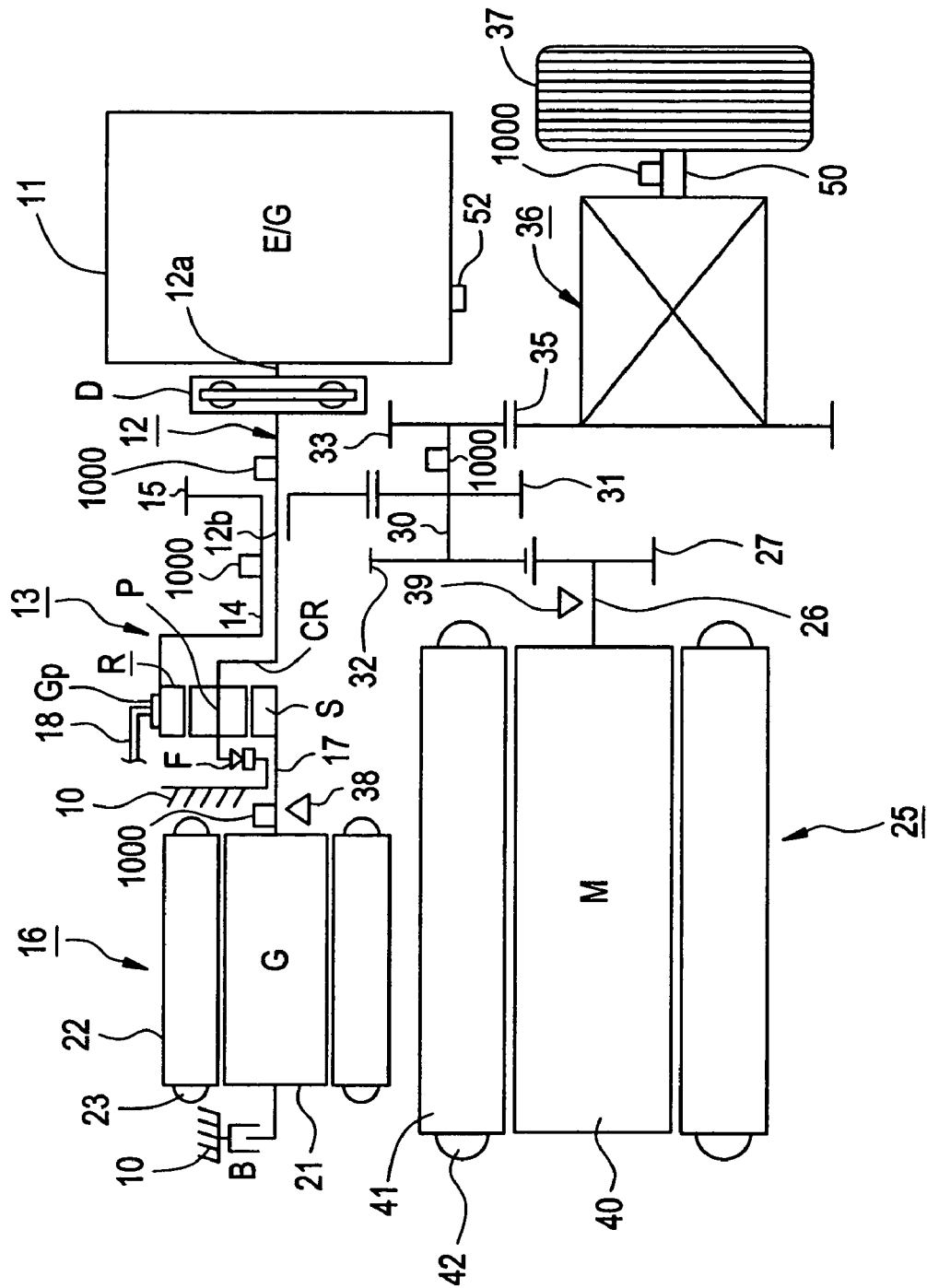
FIG. 2 is a conceptual drawing of the hybrid vehicle consistent with an exemplary embodiment of the invention.

FIG. 2 is a conceptual drawing of the hybrid vehicle consistent with an exemplary embodiment of the invention.

In the drawing, reference numeral 11 designates an engine (E/G) disposed on a first axis, reference numeral 12 designates an output shaft disposed on the first axis for outputting rotation of the engine 11 generated by driving the engine, reference numeral 13 designates a planetary gear unit as a differential rotator disposed on the first axis for changing the speed according to rotation supplied via the output shaft 12, reference numeral 14 designates an output shaft disposed on the first axis for outputting rotation after having changed the speed by the planetary gear unit 13, reference numeral 15 designates a first counter drive gear fixed to the output shaft 14 as an output gear, reference numeral 16 designates a generator (G) disposed on the first axis, being connected to the planetary gear unit 13 via a transmission shaft 17, and being further connected differentially rotatably and mechanically to the engine 11 as a first electric machine. The generator 16 is mechanically connected to a driving wheel 37.

A damper unit D is disposed on the output shaft 12, and the damper unit D is connected between an input end 12a of the output shaft 12 on the side of the engine 11 and an output end 12b thereof on the side of the planetary gear unit 13, and includes a drive member, not shown, attached to the input end 12a, a driven member, not shown, attached to the output end 12b, and a spring disposed between the drive member and the driven member as an urging member. Then, an engine torque TE transmitted to the drive member via the input end 12a is transmitted to the spring, where a drastic variation is absorbed, is transmitted to the driven member, and then is outputted to the output end 12b.

The output shaft 14 has a sleeve shape, and is disposed so as to surround the output shaft 12. The first counter drive gear 15 is disposed at the position closer to the engine 11 than to the planetary gear unit 13.

The planetary gear unit 13 includes at least a sun gear S as a first differential element, a pinion P that meshes with the sun gear S, a ring gear R that meshes with the pinion P as a second differential element, and a carrier CR that rotatably supports the pinion P as a third differential element. The sun gear S is connected to the generator 16 via the transmission shaft 17. The ring gear R is disposed on a second axis, which is parallel to the first axis, and is connected to a drive motor (M) 25, which is mechanically connected to the engine 11 and to the generator 16 so as to be capable of differential rotation as a second electric machine via the output shaft 14 and a predetermined gear train, and to the driving wheel 37. The carrier CR is connected to the engine 11 via the output shaft 12. The drive motor 25 is mechanically connected to the driving wheel 37.

A one-way clutch F is disposed between the carrier CR and a case 10 of a vehicle drive system, and the one-way clutch F is released when rotation in the normal direction is transmitted from the engine 11 to the carrier CR, while it is locked and stops rotation of the engine 11 so as to prevent reverse rotation from being transmitted to the engine 11 when rotation in the reverse direction is transmitted from the generator 16 or the drive motor 25 to the carrier CR. Therefore, when the generator 16 is driven in a state in which the engine 11 is stopped driving, a reaction force is exerted to a torque transmitted from the generator 16 by the one-way clutch F. It is also possible to dispose a brake, not shown, as a stopping device between the carrier CR and the case 10 instead of the one-way clutch F.

The generator 16 includes a rotor 21 fixed to the transmission shaft 17 so as to be capable of rotating, a stator 22 disposed around the rotor 21, and a coil 23 wound and mounted to the stator 22. The generator 16 generates electric power by rotation transmitted via the transmission shaft 17. The coil 23 is connected to a battery, not shown, and supplies DC electric current to the battery. A generator brake B is disposed between the rotor 21 and the case 10, and can lock rotation of the generator 16. Hence the generation can be mechanically stopped by engaging the generator brake B.

Reference numeral 26 designates an output shaft disposed on the second axis to which rotation of the drive motor 25 is outputted, and reference numeral 27 designates a second counter drive gear as an output gear fixed to the output shaft 26. The drive motor 25 is fixed to the output shaft 26, and includes a rotor 40 disposed so as to be capable of rotation, a stator 41 disposed around the rotor 40, and a coil 42 wound and mounted to the stator 41.

The drive motor 25 generates a drive motor torque TM by currents of U-phase, V-phase, and W-phase as alternate currents supplied to the coil 42. Therefore, the coil 42 is connected to the battery, and the DC current from the battery is converted into electric currents in the respective phases and supplied to the coil 42.

Then, in order to rotate the driving wheel 37 in the same direction as the engine 11, a counter shaft 30 is disposed on a third axis, which is parallel to the first and second axes, and a first counter driven gear 31, and a second counter driven gear 32 having a larger number of teeth than the first counter driven gear 31 are fixed to the counter shaft 30. The first counter driven gear 31 engages the first counter drive gear 15, and the second counter driven gear 32 engages the second counter drive gear 27, so that rotation of the first counter drive gear 15 is inverted and transmitted to the first counter driven gear 31, and rotation of the second counter drive gear 27 is inverted and transmitted to the second counter driven gear 32. Furthermore, a differential pinion gear 33 having a smaller number of teeth than the first counter driven gear 31 is fixed to the counter shaft 30.

A differential unit 36 is disposed on a fourth axis, which is parallel to the first to the third axes, and a differential ring gear 35 of the differential unit 36 engages the differential pinion gear 33. Therefore, rotation transmitted to the differential ring gear 35 is distributed by the differential unit 36, and is transmitted to the driving wheel 37. In this manner, rotation generated by the engine 11 can be transmitted to the first counter driven gear 31, as well as rotation generated by the drive motor 25 can be transmitted to the second counter driven gear 32, whereby the hybrid vehicle can be traveled by driving the engine 11 and the drive motor 25. The engine 11, the planetary gear unit 13, the generator 16, the drive motor 25, and the differential unit 36 constitute the vehicle drive system.

In the hybrid vehicle configured as described above, when a shift lever as a speed changing member, not shown, is operated, and a required range out of a forward travel range, a reverse travel range, a neutral range, and a parking range is selected, a shift position determination processing device, not shown, determines the selected range, and sends a range position signal to a vehicle control system, not shown. Then, when the parking range is selected, the driving wheel 37 is locked in association with the operation of the shift lever, and hence the hybrid vehicle is maintained in a stopped state. Therefore, a parking gear Gp as an engaged member, is integrally formed with the ring gear R, and when a driver operates the shift lever and selects the parking range, a parking mechanism 18 disposed so as to be capable of engaging and disengaging, is operated, and claws of a clawed pole, not shown, as an engaging member disposed so as to be capable of pivotal movement engage the parking gear Gp to lock the parking gear Gp, thereby disabling rotation of the driving wheel 37.

In the exemplary embodiment, the parking gear Gp is integrally formed on the outer peripheral surface of the ring gear R, so that the driving wheel 37 and the parking gear Gp are mechanically connected. However, it is also possible to form the parking gear Gp at a predetermined position on the output shaft 14, for example, at a position adjacent to the first counter drive gear 15. Furthermore, it is also possible to mechanically connect the driving wheel 37 and the parking gear Gp by forming the parking gear Gp on the counter shaft 30 or by forming the parking gear Gp adjacent to the differential ring gear 35.

Reference numeral 38 designates a position sensor such as a resolver as a first rotor position detecting unit for detecting a rotor position θG, which is the position of the rotor 21, and reference numeral 39 designates a position sensor such as a resolver as a second rotor position detecting unit for detecting a rotor position θM, which is the position of the rotor 40. Then, the detected rotor position θG is sent to the vehicle control system and a generator control system, not shown, and the rotor position θM is sent to the vehicle control system and a drive motor control unit, not shown. Reference numeral 50 designates a drive shaft as an output shaft of the differential unit 36, and reference numeral 52 is an engine revolution number sensor as an engine revolution number detecting unit for detecting an engine revolution number NE. The detected engine revolution number NE is sent to the vehicle control system and an engine control system, not shown.

Operation of the planetary gear unit 13 parking mechanism 18 will now be described.

Figure 3:
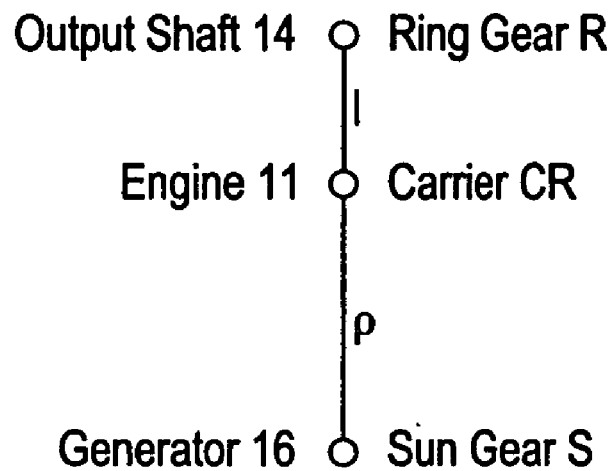
FIG. 3 is an explanatory drawing illustrating the operation of a planetary gear unit consistent with an exemplary embodiment of the invention.
Figure 4:
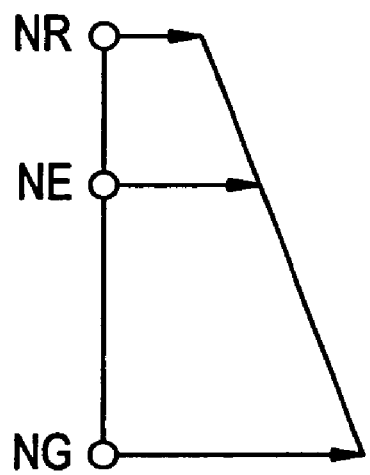
FIG. 4 is a vehicle speed chart in a state of normal travel consistent with an exemplary embodiment of the invention.
Figure 5:
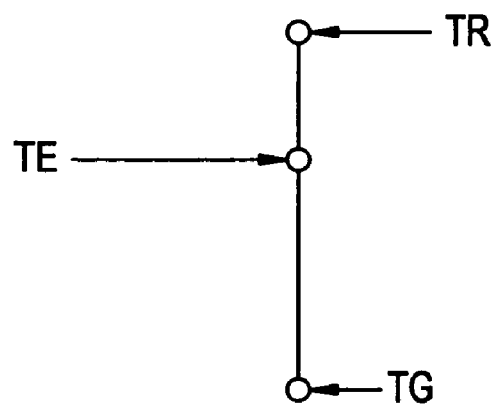
FIG. 5 is a torque chart in the state of normal travel consistent with an exemplary embodiment of the invention.

FIG. 3 is an explanatory drawing illustrating the operation of the planetary gear unit consistent with an exemplary embodiment of the invention; FIG. 4 is a vehicle speed chart in a state of normal travel consistent with an exemplary embodiment of the invention; and FIG. 5 is a torque chart in the state of normal travel consistent with an exemplary embodiment of the invention.

In the planetary gear unit 13 (FIG. 2), the carrier CR is connected to the engine 11, the sun gear S is connected to the generator 16, and the ring gear R is connected to the drive motor 25 and the driving wheel 37 respectively via the output shaft 14 and the predetermined gear train. Therefore, a ring gear revolution number NR which is the revolution number of the ring gear R and an output shaft revolution number, which is the revolution number outputted to the output shaft 14 are equivalent, the revolution number of the carrier CR and the engine revolution number NE are equivalent, and a revolution number of the sun gear S and the revolution number of a generator revolution number NG are equivalent. When the number of teeth of the ring gear R is ρ-times the number of teeth of the sun gear S (two-times in the present embodiment), the relation;

$$(\rho+1) \cdot NE = 1 \cdot NG + \rho \cdot NR$$

is established. Therefore, the engine revolution number NE can be calculated based on the ring gear revolution number NR and the generator revolution number NG according to the following equation;

$$NE = (1 \cdot NG + \rho \cdot NR)/(\rho+1) \quad (1)$$

A revolution number relational expression of the planetary gear unit 13 is composed of the aforementioned expression (1).

An engine torque TE, a ring gear torque TR, which is the torque generated at the ring gear R, and a generator torque TG have a relationship as follows;

$$TE:TR:TG = (\rho+1):\rho:1 \quad (2)$$

and receive a reacting force from each other. A torque relational expression of the planetary gear unit 13 is composed of the expression (2).

Then, in the normal travel of the hybrid vehicle, the ring gear R, the carrier CR, and the sun gear S rotate in the normal direction and, as shown in FIG. 4, the ring gear revolution number NR, the engine revolution number NE, and the generator revolution number NG are all positive values. Since the ring gear torque TR and the generator torque TG are obtained by averaging the engine torque TE by a torque ratio fixed by the number of teeth of the planetary gear unit 13, a value obtained by adding the ring gear torque TR and the generator torque TG on the torque chart shown in FIG. 5 corresponds to the engine torque TE.

Operation of the parking mechanism 18 will now be described.

Figure 6:
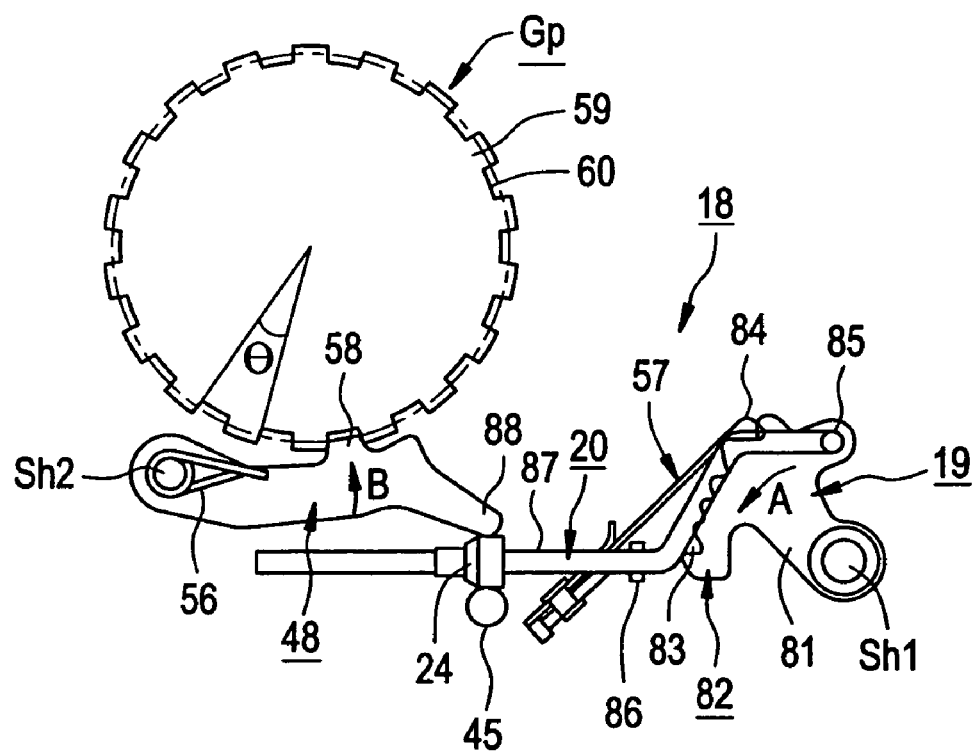
FIG. 6 is an explanatory drawing illustrating the operation of a parking mechanism consistent with an exemplary embodiment of the invention.

FIG. 6 is an explanatory drawing illustrating the operation of the parking mechanism consistent with an exemplary embodiment of the invention.

In the drawing, the parking mechanism 18 includes a plate-shaped detent lever 19 disposed so as to be pivotable about a pivotal shaft sh1 connected to the shift lever, a rod 20 moved in the fore-and-aft direction (lateral direction in the drawing) in association with pivotal movement of the detent lever 19, a cam 24 attached to a predetermined position of the rod 20, a stopper 45 for receiving the cam 24, a clawed pole 48 disposed so as to be pivotable about a pivotal shaft sh2 as an engaging member, a torsion spring 56 for urging the clawed pole 48 toward the rod 20 as a first urging member, and a detent spring 57 as a second urging member.

The clawed pole 48 is formed with claws 58 as engaging portions to be selectively engaged with the parking gear Gp at predetermined positions in the radial direction so as to project toward the outer peripheral surface of the parking gear Gp. The outer peripheral surface of the parking gear Gp is formed with a plurality of teeth 59 at a predetermined pitch, and roots 60 are formed between the respective teeth 59. Engaged portions are formed by the teeth 59 and roots 60.

The detent lever 19 includes an arm 81 extending radially outwardly from the pivotal shaft sh1, and a detent portion 82 extending laterally in the circumferential direction from the distal end of the arm 81, and is formed with a plurality of detents (engaging groove) 83 on the outer peripheral surface of the detent portion 82 corresponding to shift positions, which are the positions of the shift lever. When the pivotal shaft sh1 is rotated in conjunction with the operation of the shift lever, the detent lever 19 pivots correspondingly, and the distal end 84 of the detent spring 57 engages the detent 83 corresponding to the shift positions.

The detent lever 19 is formed with a hole 85 at one end of the detent portion 82, and the rear end (right end in the drawing) of the rod 20 is rotatably attached to the hole 85, so that the rod 20 moves in the fore-and-aft direction in conjunction with the pivotal movement of the detent lever 19.

The cam 24 is disposed at a predetermined position of the rod 20 so as to be capable of sliding with respect to the rod 20, and is formed with a projection 86 at a predetermined position rearwardly (rightwardly in the drawing) of the cam 24. A compression spring 87 is disposed between the cam 24 and the projection 86 as a third urging member so as to be capable of sliding with respect to the rod 20 and urges the cam 24 toward the front (leftward in the drawing). The cam 24 is formed with conical surfaces having apexes in the direction of the front end of the rod 20 in two steps.

In the parking mechanism 18 configured as described above, when the driver operates the shift lever and selects the parking range, the pivotal shaft sh1 rotates, and the detent lever 19 rotates in the direction indicated by an arrow A. Consistently, when the detent for parking out of the respective detents 83 engages the distal end 84, the rod 20 moves forward (moves leftward in the drawing). At this time, when the cam 24 moves forward by an urging force of the compression spring 87, and enters a gap formed between the distal end 88 of the clawed pole 48 and the stopper 45, the clawed pole 48 rotates about the pivotal shaft sh2 in the direction indicated by an arrow B and is pushed upward against the urging force of the torsion spring 56.

Consequently, the claw 58 enters the root 60, and hence the clawed pole 48 and the parking gear Gp engage, so that the parking gear Gp is locked.

When an attempt is made to push up the clawed pole 48, and the claw 58 and the teeth 59 come into abutment, the clawed pole 48 and the parking gear Gp do not engage, and hence the clawed pole 48 cannot be pushed up any longer. In this case, the cam 24 moves rearward (moves rightward in the drawing) against the urging force of the compression spring 87 in association with rotation of the detent lever 19. Then, when the hybrid vehicle slightly moves, the parking gear Gp rotates at least by an amount corresponding to one pitch (one tooth 59) of the tooth 59 and one single root 60, the claw 58 and the tooth 59 comes out of abutment and hence the claw 58 takes a position where it can enter the root 60. Then the cam 24 is moved forward by the urging force of the compression spring 87, and hence the cam 24 pushes up the clawed pole 48 and allows the clawed pole 48 and the parking gear Gp to engage.

The drive control system for a hybrid vehicle that performs control of the vehicle drive system will now be described.

Figure 7:
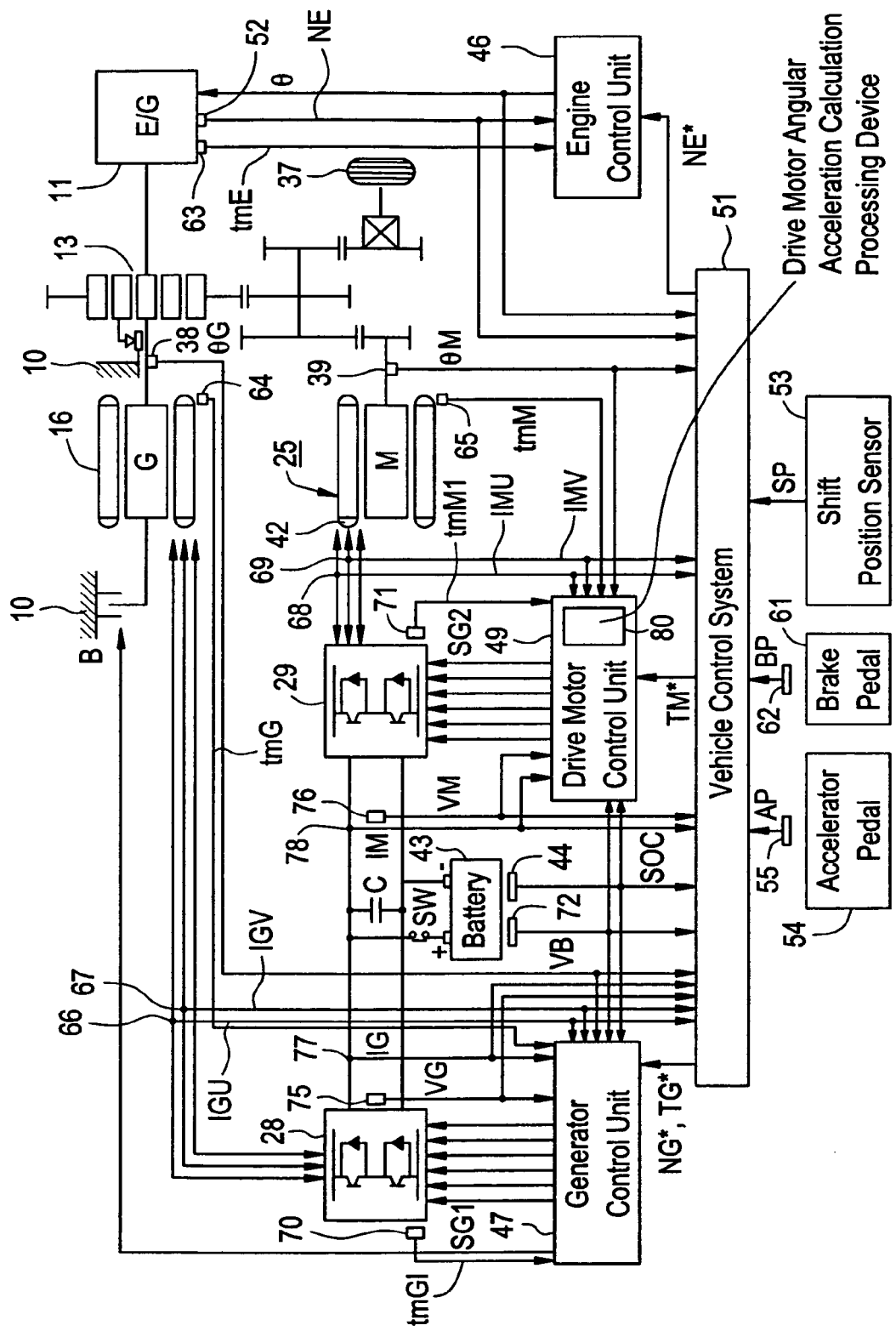
FIG. 7 is a conceptual drawing of the drive control system for the hybrid vehicle consistent with an exemplary embodiment of the invention.

FIG. 7 is a conceptual drawing of the drive control system for a hybrid vehicle consistent with an exemplary embodiment of the invention.

In the drawing, the reference numeral 10 designates the case, the reference numeral 11 designates the engine (E/G), the reference numeral 13 designates the planetary gear unit, the reference numeral 16 designates the generator (G), the reference sign B is the generator brake, the reference numeral 25 designates the drive motor (M), reference numeral 28 designates an inverter as a generator inverter for driving the generator 16, reference numeral 29 designates an inverter as a drive motor inverter for driving the drive motor 25, the reference numeral 37 designates the driving wheel, the reference numerals 38, 39 are the position sensors, and reference numeral 43 designates a battery. The inverters 28, 29 are connected to the battery 43 via a power switch SW, and the battery 43 supplies DC current to the inverters 28, 29 when the power switch SW is ON. The inverters 28, 29 each include a plurality of transistors, for example six transistors, as switching elements, and the transistors are unitized by pairs, and constitute transistor modules (IGBT) of the respective phases.

A generator inverter voltage sensor 75 as a first direct voltage detecting unit for detecting a generator inverter voltage VG, which is a DC voltage to be applied to the inverter 28 and a generator inverter current sensor 77 as a first DC current detecting unit for detecting a generator inverter current IG, which is a DC current to be supplied to the inverter 28 are disposed on the side of the entrance of the inverter 28. Also, a drive motor inverter voltage sensor 76 as a second DC voltage detecting unit for detecting a drive motor inverter voltage VM, which is a DC voltage to be applied to the inverter 29, and a drive motor inverter current sensor 78 as a second DC current detecting unit for detecting a drive motor inverter current IM, which is a DC current to be supplied to the inverter 29 are disposed on the side of the entrance of the inverter 29. The generator inverter voltage VG and the generator inverter current IG are supplied to a vehicle control system 51 and a generator control system 47, and the drive motor inverter voltage VM and the drive motor inverter current IM are sent to the vehicle control system 51 and a drive motor control unit 49. A smoothing capacitor C is connected between the battery 43 and the inverters 28, 29.

The vehicle control system 51, including a CPU and a recording unit, not shown, controls the entire vehicle drive system, and serves as a computer according to a predetermined program or data. An engine control unit 46, a generator control unit 47, and a drive motor control unit 49 are connected to the vehicle control system 51. The engine control unit 46 includes a CPU and a recording system, not shown, and sends instruction signals such as a throttle opening θ or valve timing to the engine 11 and the vehicle control system 51 for controlling the engine 11. The generator control unit 47 includes a CPU and a recording unit, not shown, and sends a drive signal SG1 to the inverter 28. Then, the drive motor control unit 49 includes a CPU and a recording unit, not shown, and sends a drive signal SG2 to an inverter 29 in order to control the drive motor 25.

The engine control unit 46, the generator control unit 47, and the drive motor control unit 49 constitutes a first control system which is positioned on the lower side of the vehicle control system 51, and the vehicle control system 51 constitutes a second control system which is positioned on the upper side of the engine control unit 46, the generator control unit 47, and the drive motor control unit 49. The engine control unit 46, the generator control unit 47, and the drive motor control unit 49 also serve as computers according to a predetermined program or data.

The inverter 28 is driven based on the drive signal SG1, generates currents of respective phases IGU, IGV, IGW upon reception of a DC current from the battery 43 at the time of power running, supplies currents of the respective phases IGU, IGV, IGW to the generator 16, generates a DC current upon reception of the currents of the respective phases IGU, IGV, IGW from the generator 16 at the time of regeneration, and supplies the same to the battery 43.

The inverter 29 is driven based on the drive signal SG2, generates currents of respective phases IMU, IMV, IMW upon reception of a DC current from the battery 43 at the time of power running, supplies the currents of the respective phases IMU, IMV, IMW to the drive motor 25, generates a DC current upon reception of the currents of the respective phases IMU, IMV, IMW from the drive motor 25 at the time of regeneration, and supplies the same to the battery 43.

Reference numeral 44 designates a battery remaining amount detecting device for detecting the remaining amount of battery SOC as a battery state of the battery 43. Reference numeral 52 designates the engine revolution number sensor for detecting the engine revolution number NE, reference numeral 53 designates a shift position sensor for detecting a shift position SP, and reference numeral 54 designates an accelerator pedal. Reference numeral 55 designates an accelerator switch as an accelerator operation detecting unit for detecting the accelerator pedal position AP, which corresponds to the position (the pressed amount) of the accelerator pedal 54. Reference numeral 61 designates a brake pedal, reference numeral 62 designates a brake switch as a brake operation detecting unit for detecting the brake pedal position BP which corresponds to the position (the pressed amount) of the brake pedal 61.

Reference numeral 63 designates an engine temperature sensor for detecting the temperature tmE of the engine 11, reference numeral 64 designates a generator temperature sensor for detecting the temperature of the generator 16, for example, the temperature tmG of the coil 23 (FIG. 2). Reference numeral 65 designates a drive motor temperature sensor for detecting the temperature of the drive motor 25, for example, the temperature tmM of the coil 42. Reference numeral 70 designates a first inverter temperature sensor for detecting the temperature tmGI of the inverter 28, and reference numeral 71 designates a second inverter temperature sensor for detecting the temperature tmMI of the inverter 29. The temperature tmE is sent to the engine control unit 46, the temperatures tmG, tmGI are sent to the generator control unit 47, and the temperatures tmM, tmMI are sent to the drive motor control unit 49.

Reference numerals 66-69 designate current sensors as AD current detecting units for detecting currents of the respective phases IGU, IGV, IMU, IMV, and reference numeral 72 designates a battery voltage sensor as a voltage detecting unit for the battery 43 that detects a battery voltage VB as the battery state. The battery voltage VB and the remaining amount of the battery SOC are sent to the generator control unit 47, the drive motor control unit 49, and the vehicle control system 51. It is also possible to detect a battery current or a battery temperature as the battery state. The battery remaining amount detecting device 44, the battery voltage sensor 72, a battery current sensor, not shown, or a battery temperature sensor, not shown constitute a battery state detecting system. The currents IGU and IGV are supplied to the generator control unit 47 and the vehicle control system 51, and the currents IMU, IMV are supplied to the drive motor control unit 49 and the vehicle control system 51.

The vehicle control system 51 sends an engine control signal to the engine control unit 46, and starts or stops the engine 11 by the engine control unit 46.

A generator revolution number calculation processing device, not shown, of the generator control unit 47 performs a generator revolution number calculating process by reading the rotor position $\theta G$, calculating a rate of change $\delta\theta G$ by differentiating the rotor position $\theta G$, and applying the value of the rate of change $\delta\theta G$ to an angular speed $\omega G$ of the generator 16 and to the generator revolution number NG. A generator angular acceleration calculation processing device, not shown, of the generator control unit 47 performs a generator angular acceleration calculating process by calculating an angular acceleration (rate of change of revolution) $\alpha G$ of the generator 16 by further differentiating the rate of change $\delta\theta G$.

A drive motor revolution number calculation processing device, not shown, of the drive motor control unit 49 performs a drive motor revolution number calculating process by reading the rotor position $\theta M$, calculating a rate of change $\delta\theta M$ by differentiating the rotor position $\theta M$, and applying the value of the rate of change $\delta\theta M$ to an angular speed $\omega M$ of the drive motor 25, and to the drive motor revolution number NM. Then, a drive motor angular acceleration calculation processing device 80, of the drive motor control unit 49 performs a drive motor angular acceleration calculating process by calculating an angular acceleration (rate of change of revolution) $\alpha M$ of the drive motor 25 by further differentiating the rate of change $\delta\theta M$.

Furthermore, a vehicle speed calculation processing device, not shown, of the vehicle control system 51 performs a vehicle speed calculating process by reading the rotor position $\theta M$, calculating the rate of change $\delta\theta M$ based on the rotor position $\theta M$, and calculating a vehicle speed V based on the rate of change $\delta\theta M$ and a gear ratio $\gamma V$ of the torque transmission system from the output shaft 26 to the driving wheel 37.

The vehicle control system 51 sets an engine target revolution number NE* representing a target value of the engine revolution number NE, a generator target revolution number NG* representing a target value of the generator revolution number NG, a generator target torque TG* representing a target value of the generator torque TG, and a drive motor target torque TM* representing a target value of the drive motor torque TM. The engine target revolution number NE*, the generator target revolution number NG*, the generator target torque TG*, and the drive motor target torque TM* constitute a control instruction value.

The rotor position $\theta G$ and the generator revolution number NG are proportional with respect to each other, and the rotor position $\theta M$ and the drive motor revolution number NM and the vehicle speed V are proportional with respect to each other. Therefore, it is possible to allow the position sensor 38 and the generator revolution number calculation processing device to function as a generator revolution number detecting unit for detecting the generator revolution number NG, to allow the position sensor 39 and the drive motor revolution number calculation processing device to function as a drive motor revolution number detecting unit for detecting the drive motor revolution number NM, or to allow the position sensor 39 and the vehicle speed calculation processing device to function as a vehicle speed detecting unit for detecting the vehicle speed V.

Although the engine revolution number sensor 52 detects the engine revolution number NE in the exemplary, it is also possible to calculate the engine revolution number NE by the engine control unit 46. Also, although the vehicle speed V is calculated based on the rotor position $\theta M$ by the engine revolution number calculation processing device in the embodiment, it is also possible to detect the ring gear revolution number NR, and calculate the vehicle speed V based on the ring gear revolution number NR or to calculate the vehicle speed V based on the driving wheel revolution number, which corresponds to the revolution number of the driving wheel 37. In this case, the ring gear revolution number sensor or the driving wheel revolution number sensor is disposed as the vehicle speed detecting unit.

Subsequently, the operation of the drive control system for a hybrid vehicle configured as described above will be explained.

Figure 8:
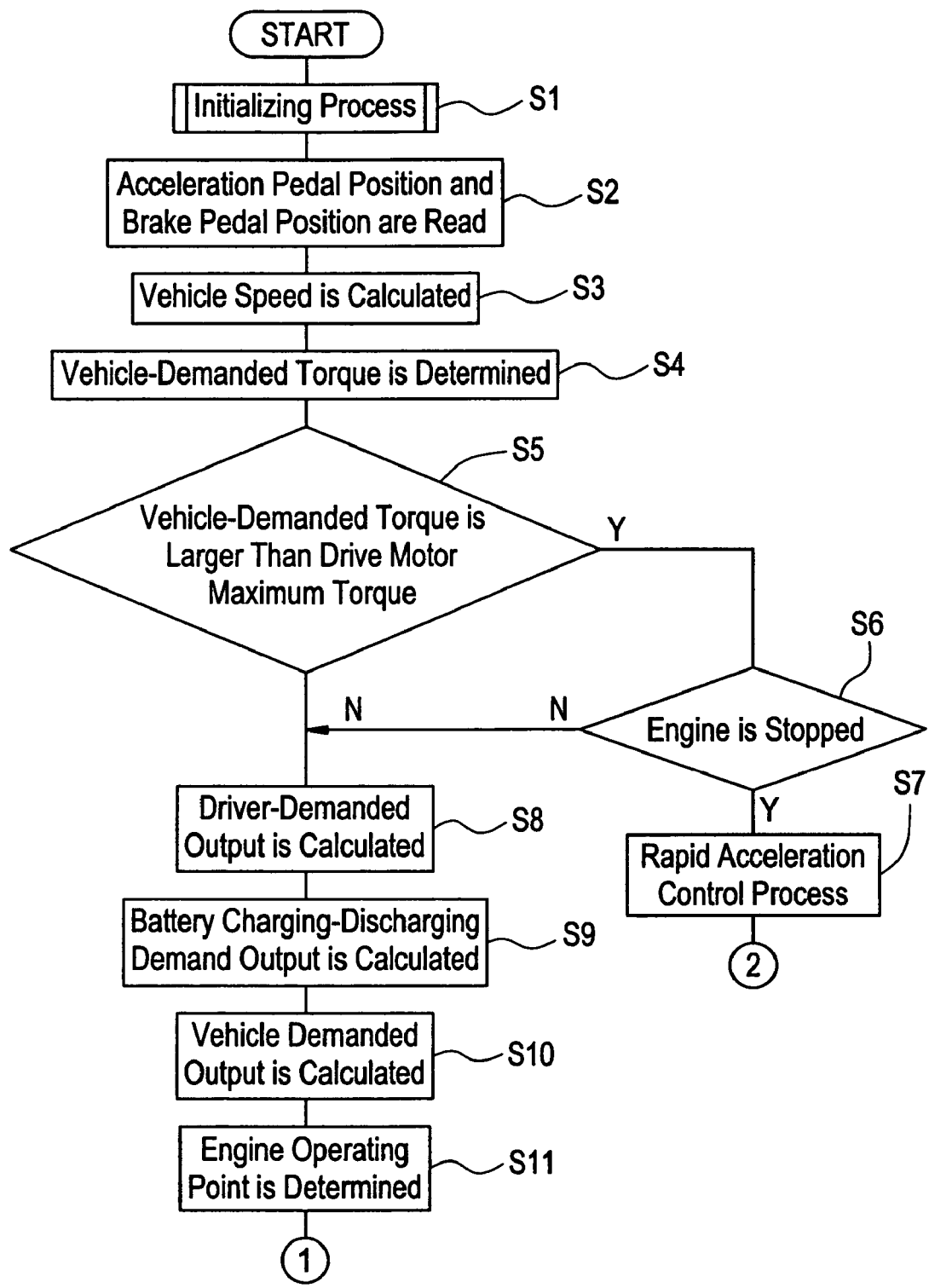
FIG. 8 is a first main flowchart showing the operation of the drive control system for a hybrid vehicle consistent with an exemplary embodiment of the invention.
Figure 9:
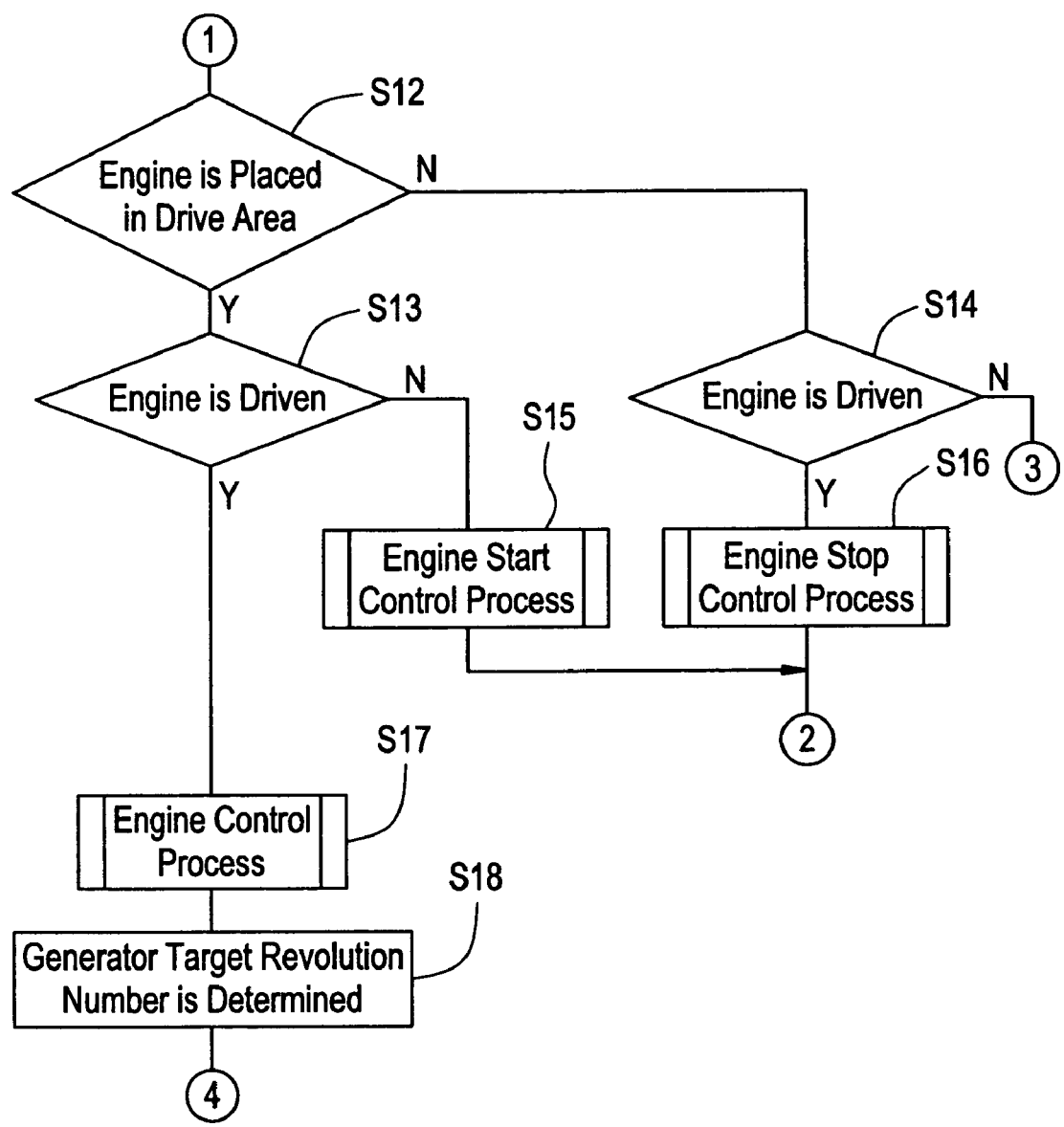
FIG. 9 is a second main flowchart showing the operation of the drive control system for a hybrid vehicle consistent with an exemplary embodiment of the invention.
Figure 10:
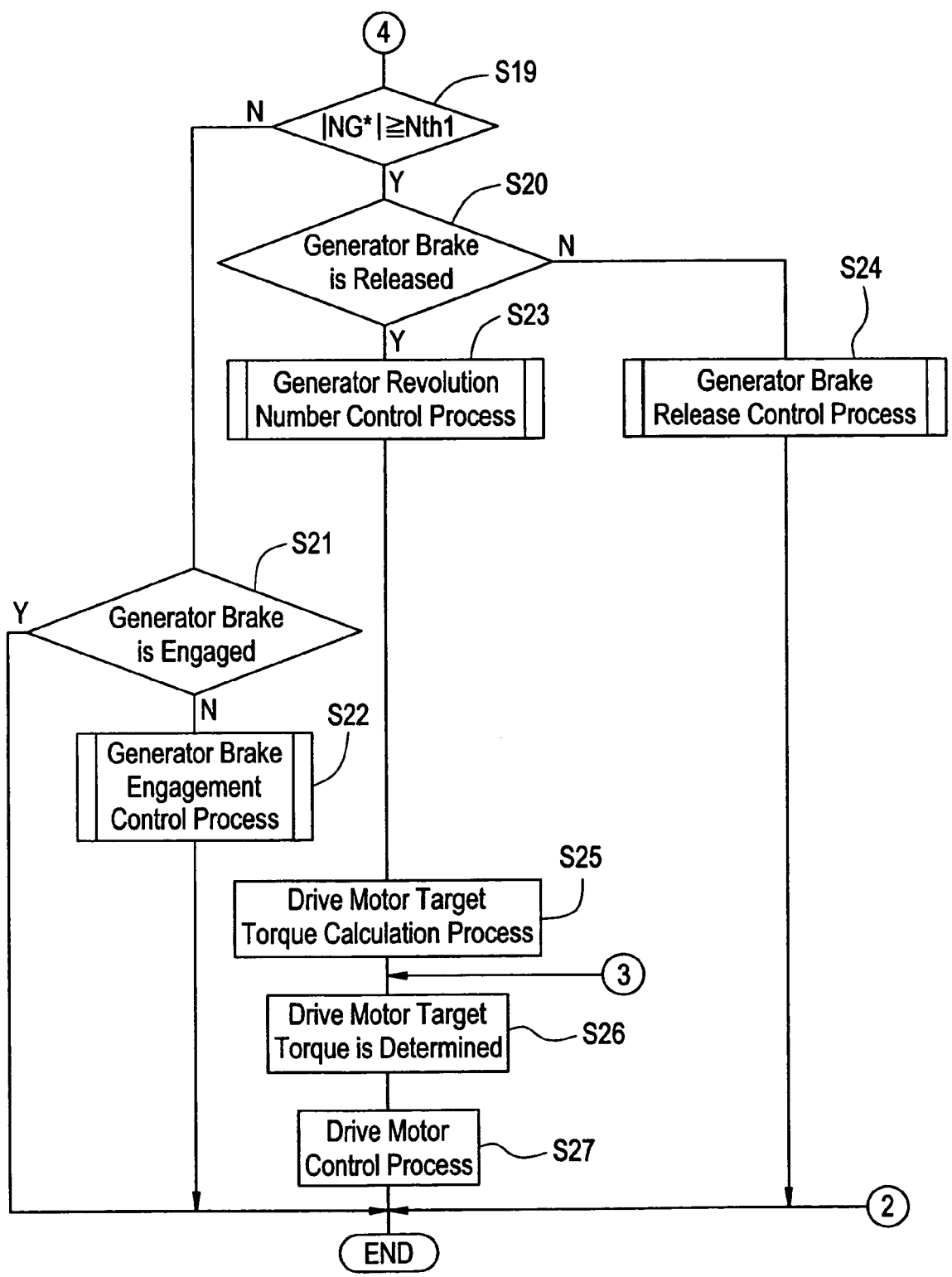
FIG. 10 is a third main flowchart showing the operation of the drive control system for a hybrid vehicle consistent with an exemplary embodiment of the invention.
Figure 11:
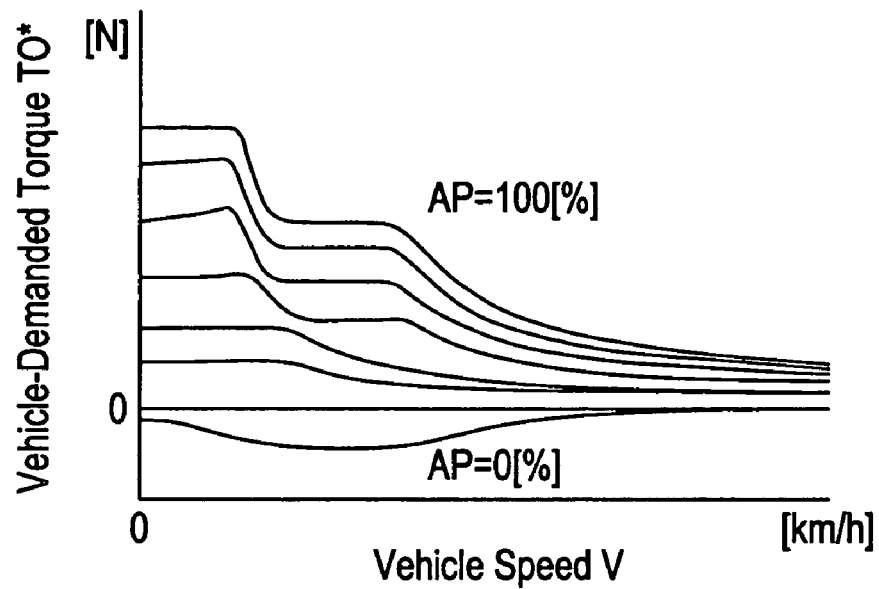
FIG. 11 is a first vehicle-demanded torque map consistent with an exemplary embodiment of the invention.
Figure 12:
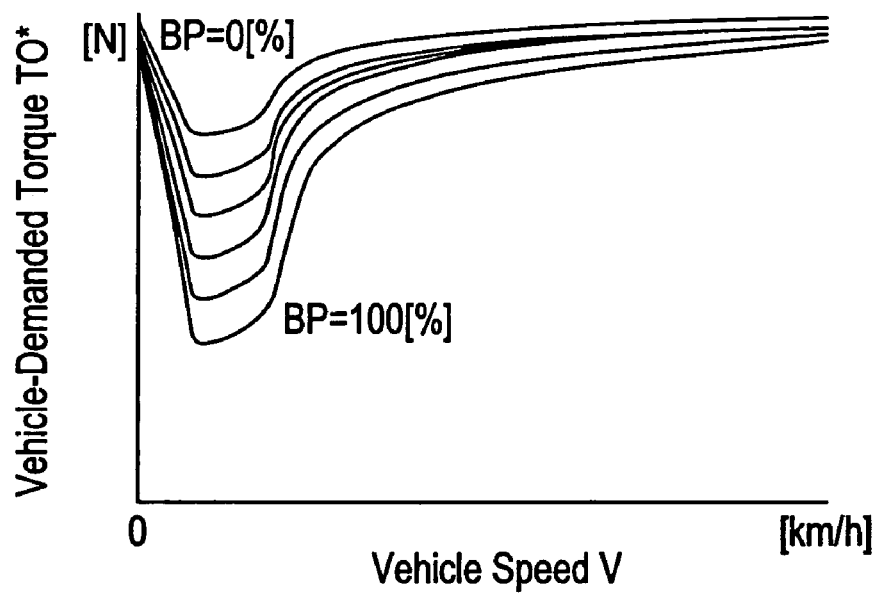
FIG. 12 is a second vehicle-demanded torque map consistent with an exemplary embodiment of the invention.
Figure 13:
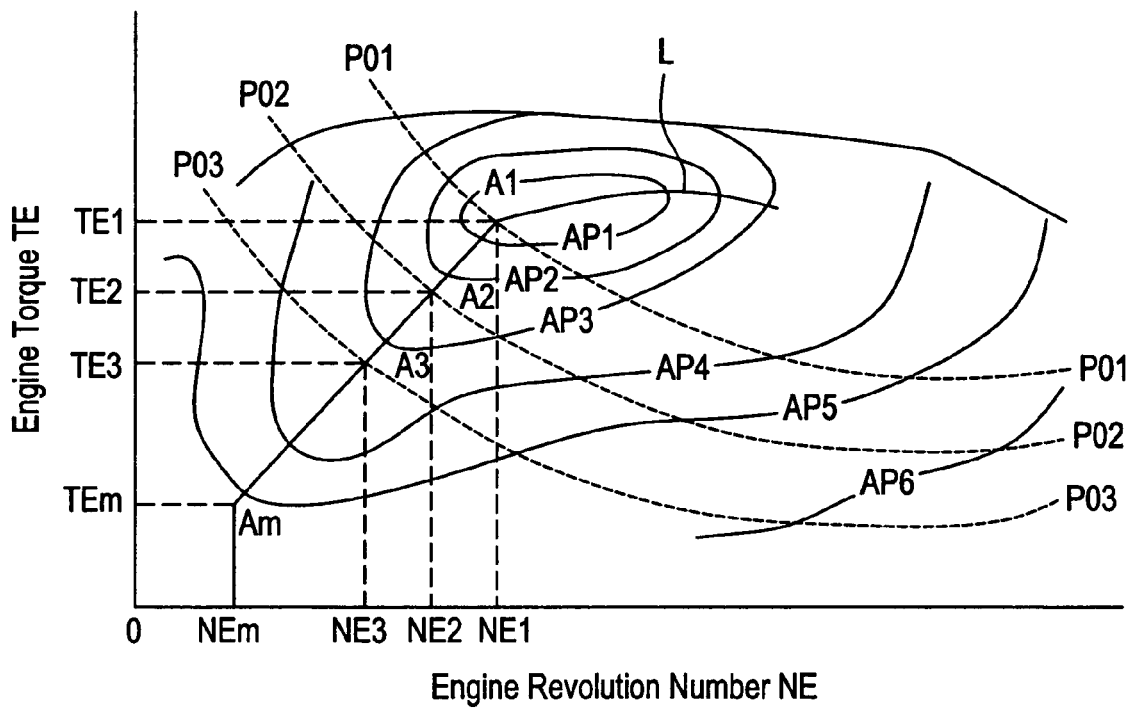
FIG. 13 is an engine target operating state map consistent with an exemplary embodiment of the invention.
Figure 14:
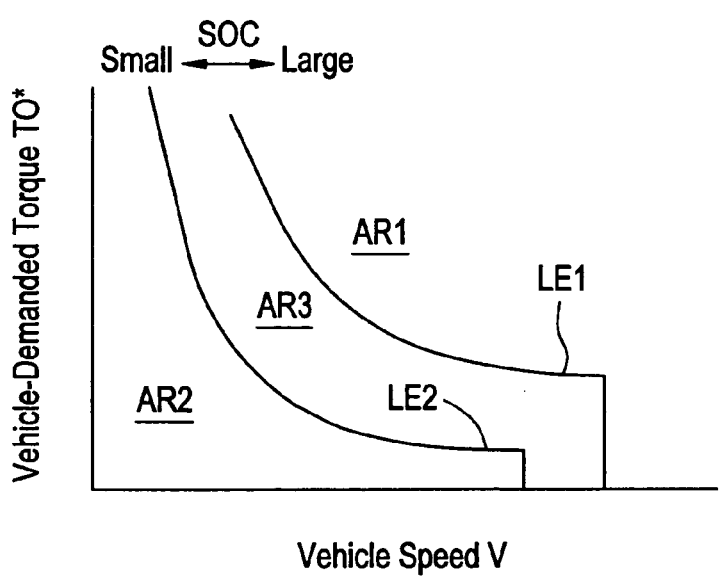
FIG. 14 is an engine drive zone map consistent with an exemplary embodiment of the present invention.

FIG. 8 is a first main flowchart showing the operation of the drive control system for a hybrid vehicle consistent with an exemplary embodiment of the invention; FIG. 9 is a second main flowchart showing the operation of the drive control system for a hybrid vehicle consistent with an exemplary embodiment of the invention; FIG. 10 is a third main flowchart showing the operation of the drive control system for a hybrid vehicle consistent with an exemplary embodiment of the invention; FIG. 11 is a first vehicle-demanded torque map consistent with an exemplary embodiment of the invention; FIG. 12 is a second vehicle-demanded torque map consistent with an exemplary embodiment of the invention; FIG. 13 is an engine target operating state map consistent with an exemplary embodiment of the invention; and FIG. 14 is an engine drive zone map consistent with an exemplary embodiment of the present invention. In FIGS. 11, 12 and 14, the lateral axis represents the vehicle speed V, and the vertical axis represents a vehicle-demanded torque TO*. In FIG. 13, the lateral axis represents the engine revolution number NE, and the vertical axis represents the engine torque TE.

An initialization processing device, not shown, in the vehicle control system 51 (FIG. 7) performs an initializing process to initialize various variables. Then, the vehicle control system 51 reads the accelerator pedal position AP from the accelerator switch 55 and the brake pedal position BP from the brake switch 62. Subsequently, the vehicle speed calculation processing device reads the rotor position $\theta M$, calculates the rate of change $\delta\theta M$ of the rotor position $\theta M$, and calculates the vehicle speed V based on the rate of change $\delta\theta M$ and the gear ratio $\gamma V$.

Subsequently, a vehicle-demanded torque determination processing device, not shown, of the vehicle control system 51 performs a vehicle-demanded torque determining process and, when the accelerator pedal 54 is pressed, by referring to the first vehicle-demanded torque map in FIG. 11 which is recorded in the recording unit of the vehicle control system 51, and when the brake pedal 61 is pressed, by referring to the second vehicle-demanded torque map in FIG. 12 which is recorded in the recording unit, to determine the vehicle-demanded torque TO* required for allowing the hybrid vehicle to travel, which is set in advance corresponding to the accelerator pedal position AP, the brake pedal position BP, and the vehicle speed V.

Then, the vehicle control system 51 judges whether or not the vehicle-demanded torque TO* is larger than a drive motor maximum torque TMmax representing the maximum value of the drive motor torque TM. If the vehicle-demanded torque TO* is larger than the drive motor maximum torque TMmax, the vehicle control system 51 judges whether or not the engine 11 is stopped and, if the engine is stopped, a rapid acceleration control processing device, not shown, of the vehicle control system 51 performs rapid acceleration control process, and drives the drive motor 25 and the generator 16 to travel the hybrid vehicle.

When the vehicle-demanded torque TO* does not exceed the drive motor maximum torque TMmax, and when the vehicle-demanded torque TO* is larger than the drive motor maximum torque TMmax and the engine 11 is not stopped, a driver-demanded output calculation processing device, not shown, of the vehicle control system 51 performs a drive-demanded output calculating process, and obtains an operator-demanded output PD by multiplying the vehicle-demanded torque TO* and the vehicle speed V according to an expression:

$$PD=TO^* \cdot V$$

When comparing the vehicle-demanded torque TO* and the drive motor maximum torque TMmax, actually, the drive motor maximum torque TMmax is multiplied by a gear ratio γMA from the output shaft 26 (FIG. 2) to the drive shaft 50, and the vehicle-demanded torque TO* and the product are compared. It is also possible to estimate the gear ratio γMA in advance and prepare the first and second vehicle-demanded torque maps.

Then, a battery charging-discharging demand output calculation processing device, not shown, of the vehicle control system 51 performs a battery charging-discharging demand output calculating process by reading the remaining amount of the battery SOC from the battery remaining amount detecting device 44, and calculating a battery charging-discharging demand output PB based on the remaining amount of the battery SOC.

Subsequently, a vehicle-demanded output calculation processing device, not shown, of the vehicle control system 51 performs a vehicle-demanded output calculating process, and obtains a vehicle-demanded output PO by adding the driver-demanded output PD and the battery charging-discharging demand output PB with the expression:

$$PO=PD+PB$$

Then, an engine target operating state setting processing device, not shown, of the vehicle control system 51 performs an engine target operating state setting process, by referencing the engine target operating state map shown in FIG. 13, which is stored in the recording unit of the vehicle control system 51, determining points A1-A3, Am where lines PO1, PO2, . . . which represent the vehicle-demanded output PO and an optimal fuel consumption curve L which represents the highest efficiency of the engine 11 at the respective accelerator pedal positions AP1-AP6 intersect with each other as operating points of the engine 11 being operated in the engine target operating state, determining engine torques TE1-TE3, TEm at the operating points as an engine target torques TE* representing the target values of the engine torque TE, determining engine revolution numbers NE1-NE3, NEm at the operating points as the engine target revolution number NE*, and sending the engine target revolution number NE* to the engine control unit 46.

Then, the vehicle control system 51 references the engine drive zone map in FIG. 14, which is stored in the recording unit of the engine control unit 46, and judges whether or not the engine 11 is in a driving zone AR1. In FIG. 14, the reference sign AR1 designates the driving zone in which the engine 11 is driven, reference sign AR2 designates a stop zone in which the engine 11 is stopped driving, and reference sign AR3 designates a hysteresis zone. Reference sign LE1 designates a line where the engine 11 in the stopped state is activated, and reference sign LE2 is a line where the engine 11 is stopped driving. The larger the remaining amount of battery SOC becomes, the more rightward in FIG. 14 the line LE1 is moved and the smaller the driving zone AR1 becomes. In contrast, the smaller the amount of the remaining amount of battery SOC becomes, the more leftward in FIG. 14 the line LE1 is moved and the larger the driving zone AR1 becomes.

When the engine 11 is not in operation in spite that the engine 11 is in the driving zone AR1, an engine start control processing device, not shown, of the vehicle control system 51 performs an engine start control process by starting the engine 11. When the engine 11 is in operation in spite that the engine 11 is not in the driving zone AR1, an engine stop control processing device, not shown, of the vehicle control system 51 performs an engine stop control process by stopping the engine 11.

When the engine 11 is not in the driving zone AR1 and the engine 11 is not in operation, the vehicle control system 51 determines the vehicle-demanded torque TO* as the drive motor target torque TM*, and sends the drive motor target torque TM* to the drive motor control unit 49. A drive motor control unit, not shown, of the drive motor control processing device 49 performs a drive motor control process by controlling the torque of the drive motor 25.

When the engine 11 is in the driving zone AR1 and the engine 11 is in operation, an engine control processing unit, not shown, of the vehicle control system 51 performs an engine control process by controlling the engine 11 according to a predetermined method.

Subsequently, a generator target revolution number calculation processing device, not shown, of the vehicle control system 51, performs a generator target revolution number calculating process by reading the rotor position θM from the position sensor 39, calculating the ring gear revolution number NR based on the rotor position θM and the gear ration γR from the output shaft 26 to the ring gear R, reading the engine target revolution number NE* determined by the engine target operating state setting process, calculating and determining the generator target revolution number NG* based on the ring gear revolution number NR and the engine target revolution number NE* with the revolution number expression.

When the hybrid vehicle of the configuration described above is being traveled by the drive motor 25 and the engine 11, and when the generator revolution number NG is low, the power consumption increases, and the efficiency of power generation of the generator 16 is decreased, and hence the fuel consumption of the hybrid vehicle increases correspondingly.

Therefore, when an absolute value of the generator target revolution number NG*, |NG*|, is smaller than a predetermined revolution number Nth1 (for example, 500 [rpm]), the generator brake B is engaged, and hence the generator 16 is mechanically stopped to decrease the fuel consumption.

Therefore, the vehicle control system 51 determines whether or not the absolute value of the generator target revolution number NG*, |NG*|, is the revolution number Nth1 or higher. When the absolute value of the generator target revolution number NG*, |NG*|, is the revolution number Nth1 or higher, the vehicle control system 51 determines whether or not the generator brake B is released. Then, when the generator brake B is released, a generator revolution number control processing unit, not shown, of the vehicle control system 51 performs a generator revolution number control process by driving the generator 16, and controlling the torque of the generator 16. When the generator brake B is not released, a generator brake releasing control processing device, not shown, of the vehicle control system 51 performs a generator brake releasing control process by releasing the generator brake B.

In the generator revolution number control process, when the generator target torque TG* is determined, and the torque of the generator 16 is controlled based on the generator target torque TG* so that the predetermined generator torque TG is generated, as described above, since the engine torque TE, the ring gear torque TR, and the generator torque TG receive a reaction force from each other, the generator torque TG is converted into the ring gear torque TR, and outputted from the ring gear R.

When the generator revolution number NG varies in association with the output of the ring gear torque TR from the ring gear R, and hence the ring gear torque TR varies, the varied ring gear torque TR is transmitted to the driving wheel 37, which results in deterioration of the feeling of travel of the hybrid vehicle. Therefore, it is devised to calculate the ring gear torque TR obtained when the torque of the generator 16 is controlled based on the generator target torque TG* while taking into account a torque corresponding to inertia (inertia of the rotor 21 and the rotor shaft) of the generator 16 in association with variations of the generator revolution number NG, estimate a drive shaft torque TR/OUT, which is a torque on the output shaft 26 obtained when the ring gear torque TR is outputted, and calculates the drive motor target torque TM* based on the estimated drive shaft torque TR/OUT to drive the drive motor 25.

In order to do so, the drive motor target torque calculation processing device 91 (FIG. 1) of the vehicle control system 51 performs a drive motor target torque calculating process to calculate the drive motor target torque TM*. Consistently the drive motor target torque calculation processing device 91 reads the generator target torque TG* and, based on the generator target torque TG* and the ratio of the number of teeth of the ring gear R with respect to the number of teeth of the sun gear S, calculates the ring gear torque TR obtained when the torque of the generator 16 is controlled based on the generator target torque TG*.

In other words, assuming that InG represents inertia of the generator 16 and αG represents the angular acceleration of the generator 16, a sun gear torque TS which is a torque applied to the sun gear S is obtained by subtracting the torque-equivalent component (inertia torque) TGI corresponding to the inertia InG from the generator target torque TG* by the expression:

$$TGI = InG \cdot \alpha G$$

and hence the expression:

$$TS = TG^* - TGI \quad (3)$$
$$= TG^* - InG \cdot \alpha G$$

is established. When the engine revolution number NE is constant, the torque-equivalent component TGI becomes a negative value with respect to an accelerating direction while the hybrid vehicle is in acceleration, and becomes a positive value with respect to the accelerating direction while the hybrid vehicle is in deceleration.

Then, assuming that the number of teeth of the ring gear R is ρ-times the number of teeth of the sun gear S, since the ring gear torque TR becomes ρ-times the sun gear torque TS. Therefore, the expression:

$$TR = \rho \cdot TS \quad (4)$$
$$= \rho \cdot (TG^* - TGI)$$
$$= \rho \cdot (TG^* - InG \cdot \alpha G)$$

is established. In this manner, the ring gear torque TR can be calculated from the generator target torque TG* and the torque-equivalent component TGI.

Subsequently, the drive motor target torque calculation processing device 91 estimates the drive shaft torque TR/OUT based on the generator target torque TG* and the torque-equivalent component TGI. In other words, the drive motor target torque calculation processing device 91 calculates by estimating the drive shaft torque TR/OUT based on the ratio of the number of teeth of the second counter drive gear 27 with respect to the ring gear torque TR and the number of teeth of the ring gear R.

When the generator brake B is brought into engagement, the generator target torque TG* is set to zero (0), and the ring gear torque TR and the engine torque TE become proportional. Therefore, when the generator brake B is engaged, the drive motor target torque calculation processing device 91 reads the engine torque TE via the vehicle control system 51, calculates the ring gear torque TR based on the engine torque TE with the torque expression, and estimates the drive shaft torque TR/OUT based on the ratio of the number of teeth of the second counter drive gear 27 with respect to the ring gear torque TR and the number of teeth of the ring gear R.

Subsequently, the drive motor target torque calculation processing device 91 calculates the amount of shortfall with the drive shaft torque TR/OUT as the drive motor target torque TM* by subtracting the drive shaft torque TR/OUT from the vehicle-demanded torque TO*. Then, the vehicle control system 51 determines the calculated drive motor target torque TM* and sends the drive motor target torque TM* to the drive motor control unit 49.

Subsequently, the drive motor control processing device of the drive motor control unit 49 performs a drive motor control process, and controls the torque of the drive motor 25 based on the determined drive motor target torque TM* to control the drive motor torque TM.

When the absolute value of the generator target revolution number NG*, |NG*|, is smaller than the revolution number Nth1, the vehicle control system 51 judges whether or not the generator brake B is engaged. When the generator brake B is not engaged, a generator brake engagement control processing unit, not shown, of the vehicle control system 51 performs a generator brake engagement control processing to engage the generator brake B.

Subsequently, flowcharts in FIGS. 8 to 10 will be described.

At Step S1, an initialization process is performed. At Step S2, the accelerator pedal position AP and the brake pedal position BP are read. At step S3, the vehicle speed V is calculated. At Step S4, the vehicle-demanded torque TO* is determined.

At Step S5, it is determined whether or not the vehicle-demanded torque TO* is larger than the drive motor maximum torque TMmax. When the vehicle-demanded torque TO* is larger than the drive motor maximum torque TMmax, the procedure goes to Step S6, and when the vehicle-demanded torque TO* is the drive motor maximum torque TMmax or below, the procedure goes to Step S8.

At Step S6, it is determined whether or not the engine 11 is in a stopped state. When the engine 11 is in the stopped state, the procedure goes to Step S7, and when the engine 11 is not in the stopped state, the procedure goes to Step S8.

At Step S7, the rapid acceleration control process is performed, and then the process is terminated. At Step S8, the driver-demanded output PD is calculated. At Step S9, the battery charging-discharging demand output PB is calculated. At Step S10, the vehicle-demanded output PO is calculated. At Step S11, the operating point of the engine 11 is determined.

At Step S12, it is determined whether or not the engine 11 is in the driving zone AR1. When the engine 11 is in the driving zone AR1, the procedure goes to Step S13, and when the engine is not placed in the drive area AR1, the procedure goes to Step S14.

At Step S13, it is determined whether or not the engine 11 is driven. When the engine 11 is in operation, the procedure goes to Step S17, and when the engine is not in operation, the procedure goes to Step S15.

At Step S14, it is determined whether or not the engine is in operation. When the engine 11 is in operation, the procedure goes to Step S16, and when it is not in operation, the procedure goes to Step S26.

At Step S15, the engine start control process is performed, and process is terminated. At Step S16, the engine stop control process is performed, and the process is terminated. At Step S17, the engine control process is performed. At Step S18, the generator target revolution number NG* is determined.

At step S19, it is determined whether or not the absolute value of the generator target revolution number NG*, |NG*|, is the revolution number Nth1 or higher. When the absolute value of the generator target revolution number NG*, |NG*|, is the revolution number Nth1 or higher, the procedure goes to Step S20, and when the absolute value of the generator target revolution number NG*, |NG*|, is smaller than the revolution number Nth1, the procedure goes to Step S21.

At Step S20, it is determined whether or not the generator brake B is released. When the generator brake B is released, the procedure goes to Step S23, and when it is not released, the procedure goes to Step S24.

At Step S21, it is determined whether or not the generator brake B is engaged. When the generator brake B is engaged, the process is terminated, and when it is not engaged, the procedure goes to Step S22.

At Step S22, it is determined whether a generator brake engagement control process is performed and then the process is terminated.

At Step S23, the generator revolution number control process is performed. At Step S24, the generator brake release control process is performed, and the process is terminated. At Step S25, the drive motor target torque calculation process is performed. At Step S26, the drive motor target torque TM* is determined. At Step S27, the drive motor control process is performed and then the process is terminated.

A subroutine of the engine start control process in Step S15 as shown in FIG. 9 is explained.

Figure 15:
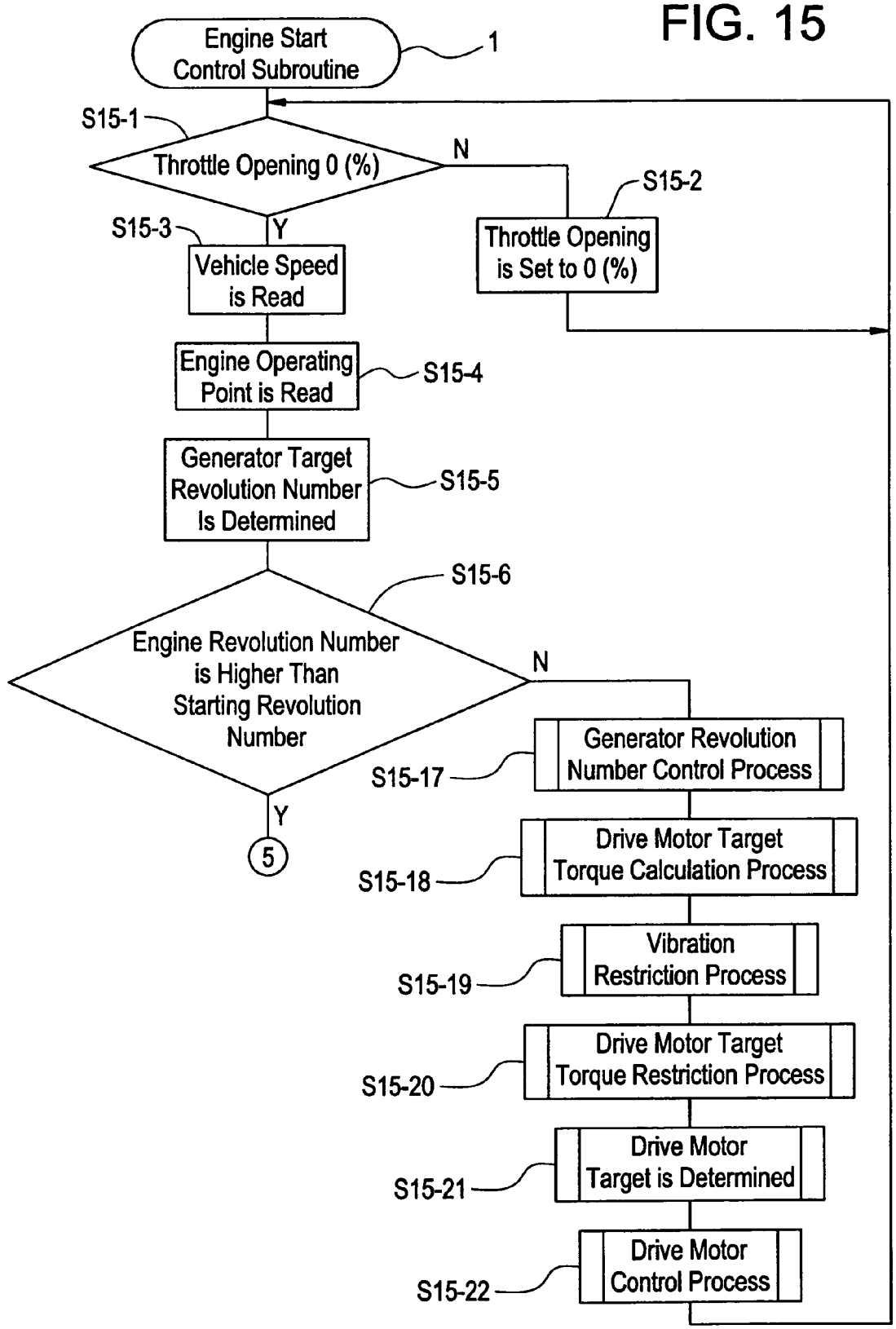
FIG. 15 is a first drawing showing a subroutine of an engine start control process consistent with an exemplary embodiment of the present invention.
Figure 16:
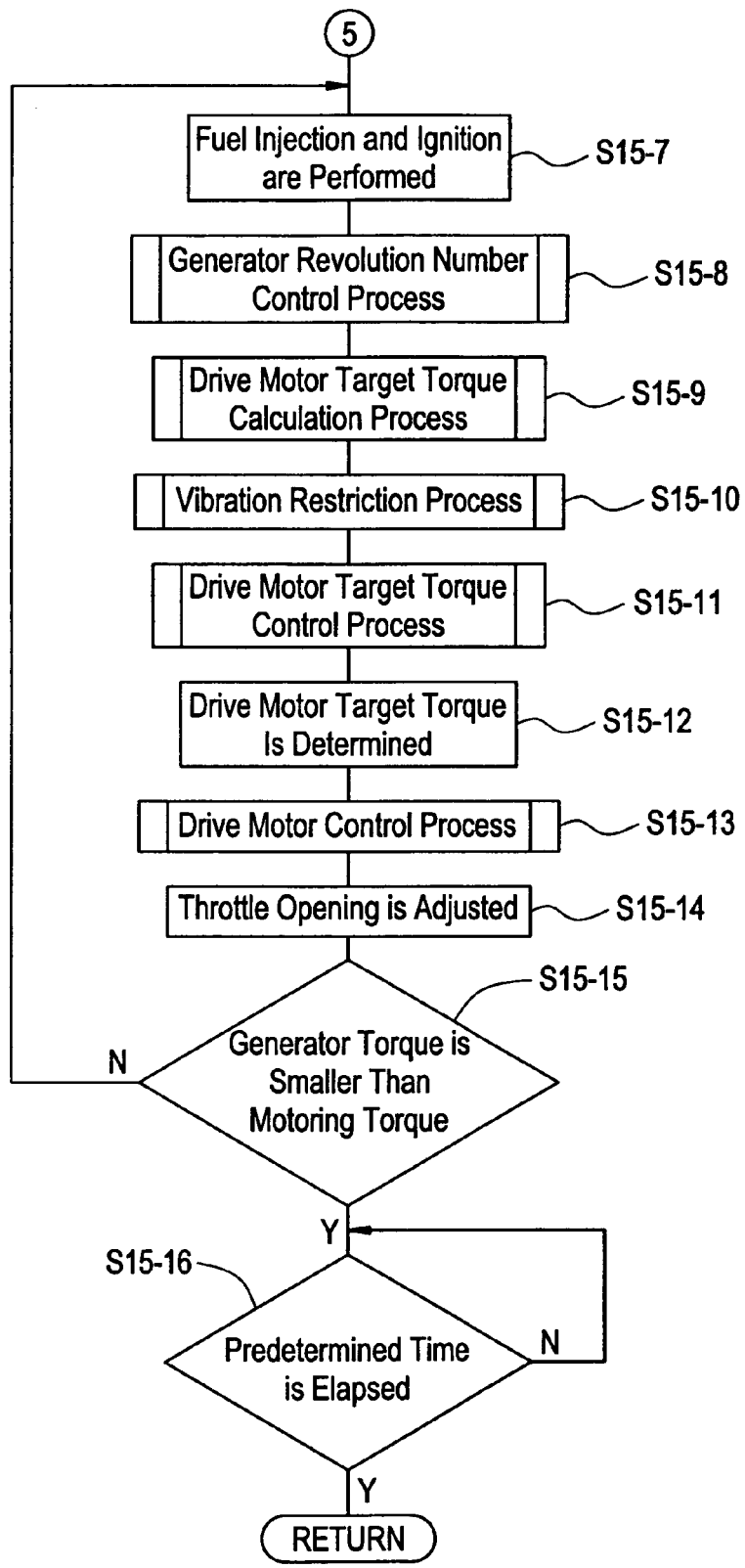
FIG. 16 is a second drawing showing a subroutine of the engine start control process consistent with an exemplary embodiment of the invention.
Figure 17:
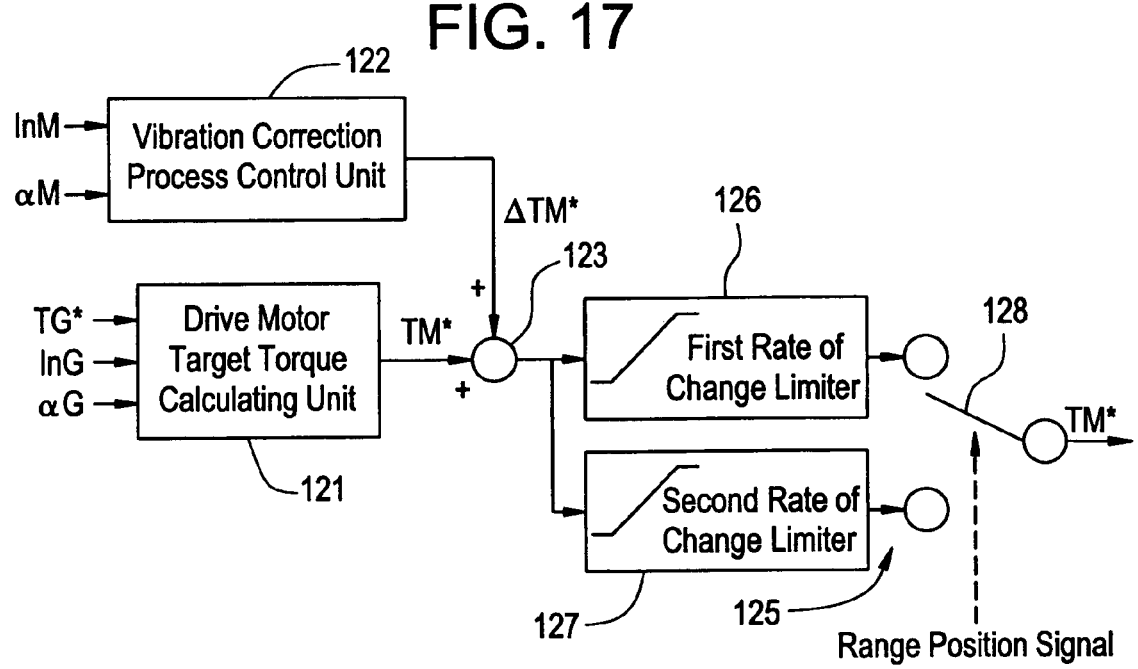
FIG. 17 is a block diagram showing a correction/restriction unit consistent with an exemplary embodiment of the invention.
Figure 18:
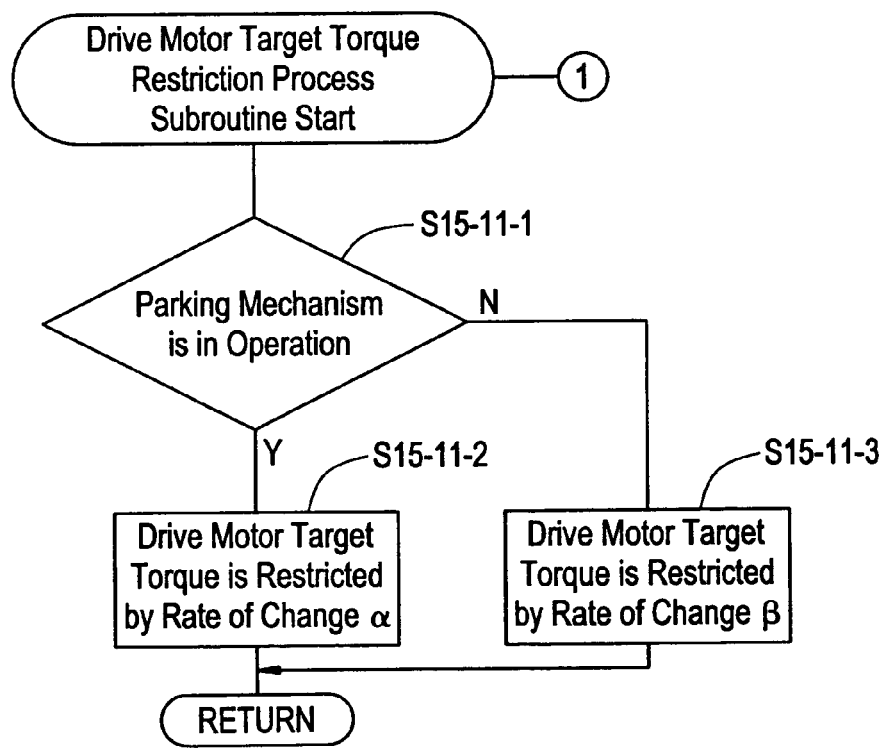
FIG. 18 is a drawing showing a subroutine of a drive motor target torque restriction process consistent with an exemplary embodiment of the invention.
Figure 19:
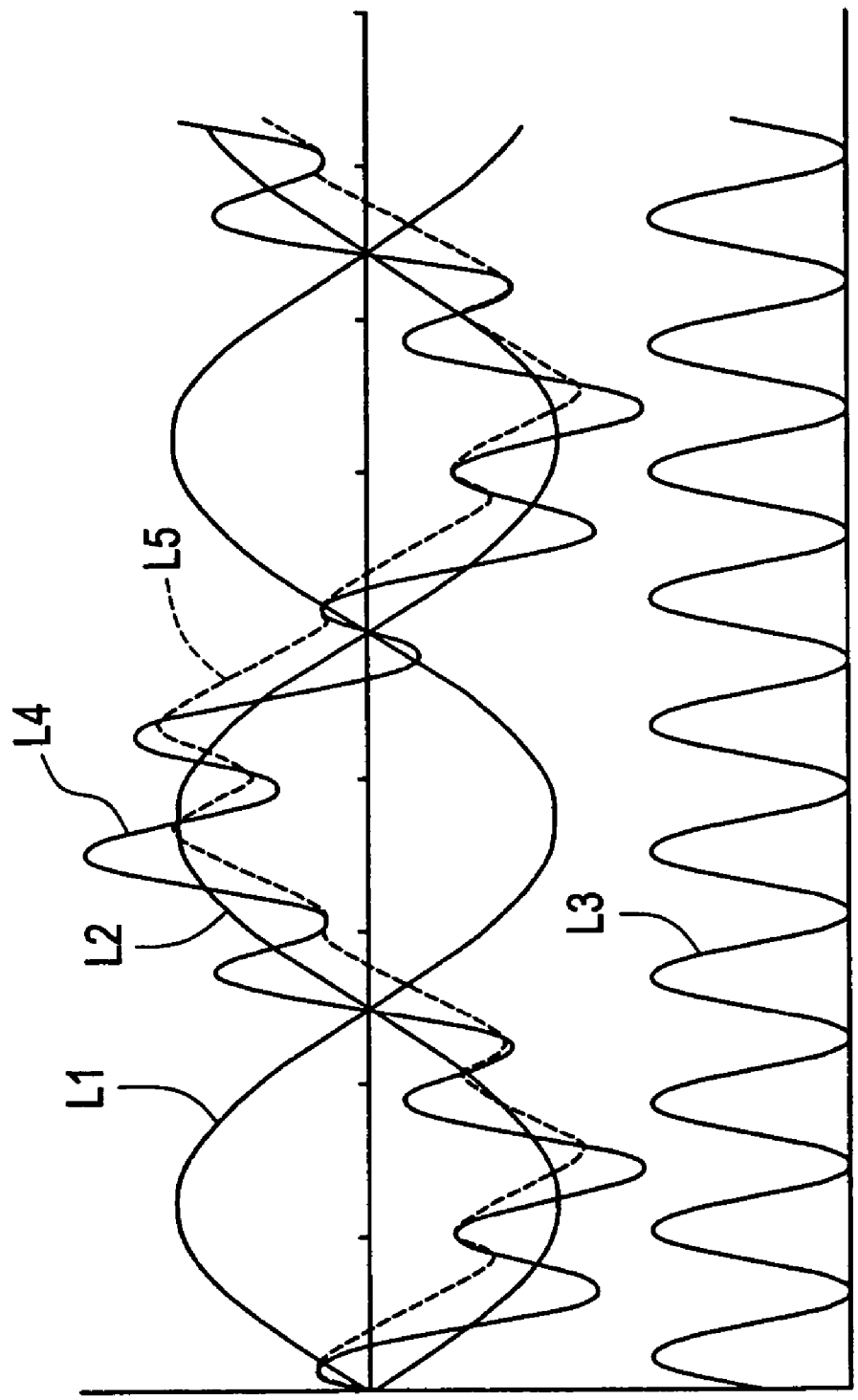
FIG. 19 is a time chart showing the operation of the correction/restriction unit consistent with an exemplary embodiment of the invention.

FIG. 15 is a first drawing showing a subroutine of the engine start control process consistent with an exemplary embodiment of the invention; FIG. 16 is a second drawing showing the subroutine of the engine start control process consistent with an exemplary embodiment of the invention; FIG. 17 is a block diagram showing a correction/restriction unit consistent with an exemplary embodiment of the invention; FIG. 18 is a drawing showing a subroutine of the drive motor target torque restriction process consistent with an exemplary embodiment of the invention; FIG. 19 is a time chart showing the operation of the correction/restriction unit consistent with an exemplary embodiment of the invention.

The engine start control processing device of the vehicle control system 51 (FIG. 7) reads the throttle opening θ, and when the throttle opening θ is zero (%), reads the vehicle speed V calculated by the vehicle speed calculation processing device, and reads an operating point of the engine 11 determined by the engine target operating state setting processing device.

Then, the generator target revolution number calculation processing device of the vehicle control system 51 reads the rotor position θM, calculates the ring gear revolution number NR based on the rotor position θM and the gear ration γR, reads the engine target revolution number NE* at the operating point, calculates and determines the generator target revolution number NG* by the revolution number expression based on the ring gear revolution number NR and the engine target revolution number NE*, and sends it to the generator control unit 47.

Then, the generator control unit 47 receives the generator target revolution number NG*, and drives the generator 16 by the generator target revolution number NG*.

Subsequently, the vehicle control system 51 compares the engine revolution number NE and a preset starting revolution number NEth1, and judges whether or not the engine revolution number NE is higher than the starting revolution number NEth1. When the engine revolution number NE is higher than the starting revolution number NEth1, the engine start control processing device performs fuel injection and ignition at the engine 11, and starts the engine 11.

Subsequently, the generator revolution number control processing device of the vehicle control system 51 drives the generator 16 based on the generator target revolution number NG*, increases the generator revolution number NG, and increases the engine revolution number NE correspondingly.

When controlling the generator revolution number NG to make the engine revolution number NE correspond the engine target revolution number NE*, it is necessary to generate the drive motor torque TM by the drive motor 25 so as to correspond to the generator torque TG in order to receive a reaction force generated when revolving the engine 11.

Therefore, as shown in FIG. 17, a drive motor target torque calculating unit 121 as the drive motor target torque calculation processing device 91 (FIG. 1) of the vehicle control system 51 estimates the drive shaft torque TR/OUT to be obtained when the generator revolution number control process is performed based on the generator target revolution number NG*, calculates the drive motor target torque TM* based on the drive shaft torque TR/OUT, and send it to the drive motor control unit 49.

However, since twisting occurs on the vehicle output shafts such as the output shafts 12 and 14 (FIG. 2), the transmission shaft 17, the counter shaft 30, and the drive shaft 50 as the engine torque TE varies, when the drive motor target torque TM* is sent to the drive motor control unit 49 as is, and the drive motor 25 is driven, vibrations occur on the respective vehicle output shafts, which gives an uncomfortable feeling to the driver.

Therefore, a vibration correction process control unit 122 as the vibration restriction processing device, not shown, of the vehicle control system 51, performs a vibration restriction process, corrects the drive motor target revolution number NM*, restricts variations of the drive motor revolution number NM, and prevents the respective vehicle output shafts from vibration.

Therefore, the vibration correction process control unit 122 calculates variation ΔTM of the drive motor torque TM in association with vibration as shown in a line L1 in FIG. 19 by reading inertia InM and the angular acceleration αM of the drive motor 25, and multiplying the angular acceleration ΔM by the inertia InM with the expression:

$$\Delta TM = InM \cdot \alpha M$$

and then calculates a torque correction value ΔTM* for canceling the variation ΔTM as shown by a line L2 in FIG. 19 with the expression:

$$\Delta TM^* = -InM \cdot \alpha M$$

An adder 123 corrects the drive motor target torque TM* by adding the torque correction value ΔTM* to the drive motor target torque TM*. In this manner, the torque correction value ΔTM* is calculated so that the angular acceleration αM becomes smaller than a predetermined value, in this embodiment, so that the angular acceleration αM becomes zero, and feedback control is performed.

Although the feedback control is performed so that the angular acceleration αM becomes zero in the vibration restriction process in this embodiment, the feedback control can be performed by disposing revolution number sensors 1000, as detecting units for detecting the revolution numbers of the respective shafts at least at two positions of the respective shafts such as the output shafts 12, 14, the transmission shaft 17, the counter shaft 30, and the drive shaft 50, and calculating the torque correction value ΔTM* so that the difference of the revolution number detected by the respective revolution number sensors becomes smaller than a predetermined value, for example, becomes zero.

Although the angular acceleration αG of the generator 16 is used for calculating the drive motor target torque TM*, and the angular acceleration αM of the drive motor 25 is used for calculating the torque correction value ΔTM*, the angular acceleration αG, αM are calculated by differentiating the rotor positions θG, θM twice. Therefore, when noise as shown by a line L3 in FIG. 19 is added to the sensor outputs of the position sensors 38, 39, and hence detection error occurs, the drive motor target torque TM* and the torque correction value ΔTM* cannot be calculated with high degree of accuracy. For example, when the detection error occurs in the sensor outputs of the position sensors 38, 39, the torque correction value ΔTM* takes a value as indicated by a line L4 in FIG. 19.

Therefore, as in the case in which the engine 11 is activated, for example, when the parking mechanism 18 (FIG. 2) is in operation, grating sounds may be generated between the claws 58 of the clawed pole 48 (FIG. 6) and the teeth 59 of the parking gear Gp in association with variations in the engine torque TE.

Therefore, a drive motor target torque restriction processing unit 125 as the drive motor target torque restriction processing device 92 of the vehicle control system 51 performs the drive motor target torque restriction process, and restricts variation ΔTM of the drive motor target torque TM* while the parking mechanism 18 is in operation.

Therefore, the drive motor target torque restriction processing unit 125 includes first and second rate-of-change limiters 126, 127 and a changeover switch 128, and values α, β (α<β) of a rate of change ΔTM* of the drive motor target torque TM* are set to the first and second rate-of-change limiters 126, 127.

Therefore, the drive motor target torque restriction processing unit 125 reads a range position signal, judges whether or not the parking mechanism 18 is in operation based on the range position signal and, when the parking mechanism 18 is in operation, selects the first rate-of-change limiter 126 by the changeover switch 128, restricts the drive motor target torque TM* by the rate of change a and, when the parking mechanism 18 is not in operation, selects the second rate-of-change limiter 127 by the changeover switch 128, and restricts the drive motor target torque TM* by the rate of change β.

In other words, the drive motor target torque restriction processing unit 125 restricts in such a manner that the rate of change δTM* becomes smaller in the case where the parking mechanism 18 is in operation than in the case where the parking mechanism 18 is not in operation.

Therefore, even when noise is added to the sensor outputs of the position sensors 38, 39 and hence the detection error occurs, the rate of change δ TM* of the drive motor target torque TM* is kept to a small value, and variations in the drive motor target torque TM* are restricted. Therefore, as indicated by a line L5 in FIG. 19, variations in torque correction value ΔTM* can be substantially reduced.

As a consequence, generation of the grating sounds between the claws 58 of the clawed pole 48 and the teeth 59 of the parking gear Gp can be prevented.

Subsequently, the vehicle control system 51 calculates and determines the drive motor target torque TM* based on the rate of change δTM* and sends it to the drive motor control unit 49. The drive motor control processing device of the drive motor control unit 49 performs the drive motor control process.

In the exemplary embodiment, although the drive motor target torque restriction processing unit 125 is adapted to restrict the rate of change δTM* of the drive motor target torque TM*, it is also possible to restrict the torque correction value ΔTM* at a predetermined rate, to restrict the torque-equivalent component TGI by the amount corresponding to the inertia InG at a predetermined rate of change, or to restrict the torque correction value ΔTM* and the torque-equivalent component TGI at a predetermined rate of change.

Subsequently, the engine start control processing device adjusts the throttle opening θ so that the engine revolution number NE meets the engine target revolution number NE*. Then, the engine start control processing device judges whether or not the generator torque TG is smaller than a motoring torque TEth in association with start of the engine 11 in order to judge whether or not the engine 11 is normally driven, and waits until a predetermined time is elapsed in a state in which the generator torque TG is smaller than the motoring torque TEth.

Also, when the engine revolution number NE is smaller than the starting revolution number NEth1, the generator revolution number control processing device performs a generator revolution number control process based on the generator target revolution number NG*, and subsequently, the drive motor target torque calculating unit 121 estimates the drive shaft torque TR/OUT based on the generator target revolution number NG* as described above, and calculates the drive motor target torque TM* based on the drive shaft torque TR/OUT. Then, the vibration correction process control unit 122 corrects the drive motor target revolution number NM* for restricting variations in the drive motor revolution number NM, and the drive motor target torque restriction processing unit 125 performs a drive motor target torque restriction process and, when the parking mechanism 18 is in operation, variations in drive motor target torque TM* is restricted. In this manner, the drive motor target torque TM* is determined, and the drive motor control process is performed.

Subsequently, the flowcharts in FIGS. 15 and 16 will be described.

At Step S15-1, it is determined whether or not the throttle opening θ is zero (%). When the throttle opening θ is zero (%), the procedure goes to Step S15-3, when it is not zero (%), the procedure goes to Step S15-2.

At Step S15-2, the throttle opening θ is set to zero (%), and the procedure goes to Step S15-1. At Step S15-3, the vehicle speed V is read. At Step S15-3, the operating point of the engine 11 is read. At Step S15-5, the generator target revolution number NG* is determined.

At Step S15-6 it is determined whether or not the engine revolution number NE is higher than the starting revolution number NEth1. When the engine revolution number NE is higher than the starting revolution number NEth1, the procedure goes to the step S15-7, and when the engine revolution number NE is the starting revolution number NEth1 or below, the procedure goes to Step S15-17.

At Step S15-7, fuel injection and ignition are performed. At Step S15-8, the generator revolution number control process is performed. At Step S15-9, the drive motor target torque calculation process is performed. At Step S15-10, the vibration restriction process is performed. At Step S15-11, the drive motor target torque restriction process is performed. At Step S15-12, the drive motor target torque TM* is determined. At Step S15-13, the drive motor control process is performed. At Step S15-14, the throttle opening θ is adjusted.

At Step S15-15, it is determined whether or not the generator torque TG is smaller than the motoring torque TEth is judged. When the generator torque TG is smaller than the motoring torque TEth, the procedure goes to Step S15-16, and when the generator torque TG is the motoring torque TEth or higher, the procedure goes back to Step S15-7.

At Step S15-16, elapse of a predetermined time is awaited and, after elapse of a predetermined time occurs, returns. At Step S15-17, the generator revolution number control process is performed. At Step S15-18, the drive motor target torque calculation process is performed. At Step S15-19, the vibration restriction process is performed. At Step S15-20, the drive motor target torque restriction process is performed. At Step S15-21, the drive motor target torque TM* is determined. At Step S15-22, the drive motor control process is performed, and the procedure goes back to Step S15-1.

Subsequently, a flowchart in FIG. 18 will be described. In this case, since the drive motor target torque restriction process in Step S15-20 in FIG. 15 and the drive motor target torque restriction process in Step S15-11 in FIG. 16 are the same, the drive motor target torque restriction process in Step S15-11 in FIG. 16 will be described.

At Step S15-11-1, it is determined whether or not the parking mechanism 18 is in operation. When the parking mechanism 18 is in operation, the procedure goes to Step S15-11-2 and, when it is not in operation, the procedure goes to Step S15-11-3. At Step S15-11-2, the drive motor target torque TM* is restricted by the rate of change a, and returned. At Step S15-11-3, the drive motor target torque TM* is restricted by the rate of change β, and returned.

Next, a subroutine of the engine stop control process in Step S16 in FIG. 9 will be described.

Figure 20:
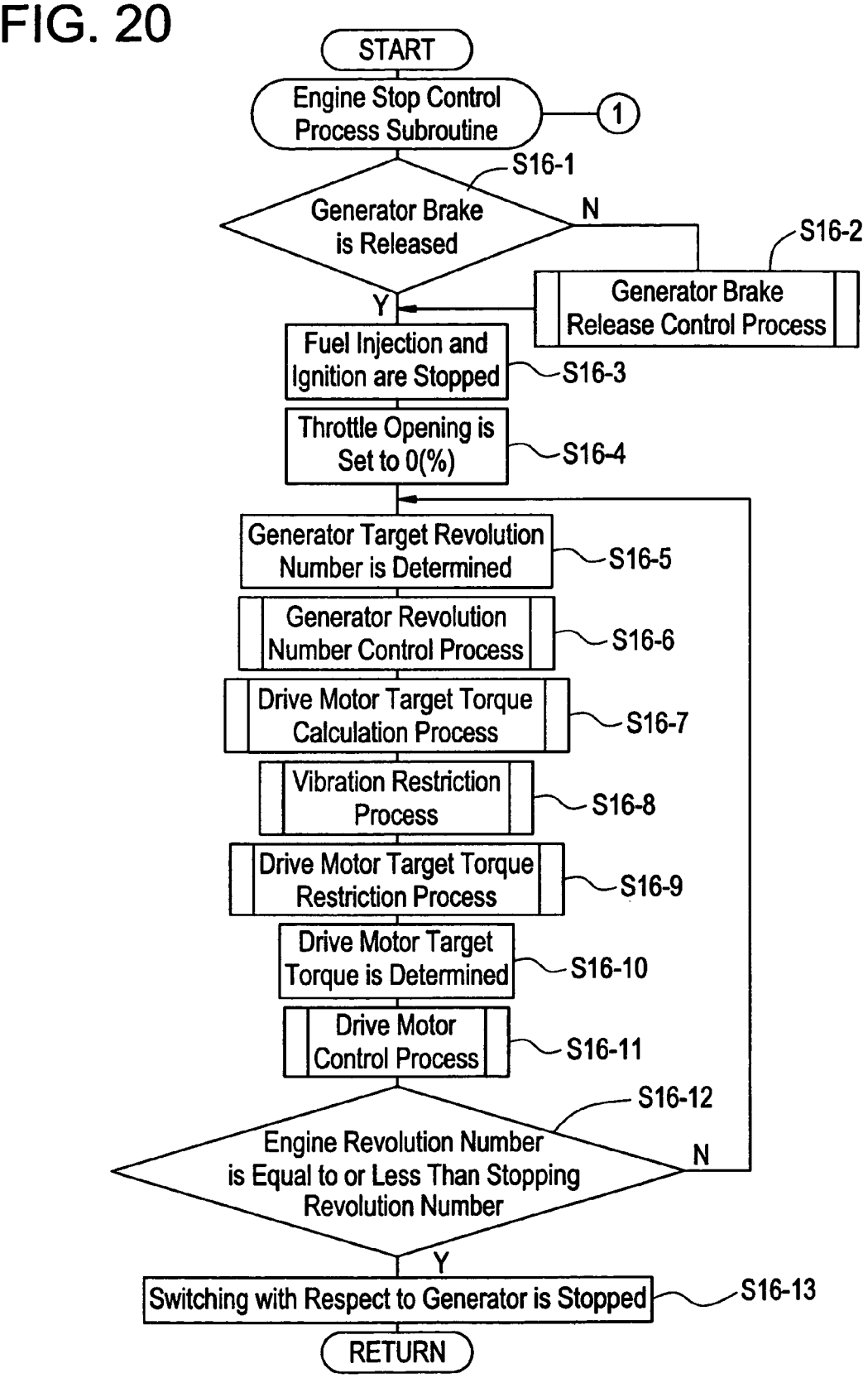
FIG. 20 shows a subroutine of an engine stop control process consistent with an exemplary embodiment of the invention.

FIG. 20 shows a subroutine of the engine stop control process consistent with an exemplary embodiment of the invention.

The vehicle control system 51 (FIG. 7) judges whether or not the generator brake B is released. When the generator brake B is not released and is engaged, the generator brake releasing control processing device performs the generator brake releasing control process, and releases the generator brake B.

When the generator brake B is released, the engine stop control processing device stops fuel injection and ignition in the engine 11, and sets the throttle opening θ to zero (%).

Then, the generator target revolution number calculation processing device of the vehicle control system 51 reads the ring gear revolution number NR, calculates and determines the generator target revolution number NG* with the revolution number expression based on the ring gear revolution number NR and the engine target revolution number NE* (zero[rpm]), and sends it to the generator control unit 47. Then, the generator control unit 47 performs the generator revolution number control process.

Thereafter, when the parking mechanism 18 (FIG. 2) is in operation, variations in the drive motor target torque TM* are restricted so as to prevent the grating sound from generating when the engine 11 is stopped. In other words, the drive motor target torque calculation processing device 91 (FIG. 1) of the vehicle control system 51 estimates the drive shaft torque TR/OUT obtained when the generator revolution number control process is performed based on the generator target revolution number NG*, and calculates the drive motor target torque TM* based on the drive shaft torque TR/OUT. Subsequently, the vibration restriction processing device performs the vibration restricting process, and corrects the drive motor target revolution number NM* by adding the torque correction value ΔTM* to the drive motor target revolution number NM* for preventing variations in of the drive motor revolution number NM. Then, the drive motor target torque restriction processing unit 125 (FIG. 17) restricts variations in the drive motor target torque TM* while the parking mechanism 18 is in operation (FIG. 2). Therefore, in this case as well, generation of the grating sound in the parking mechanism 18 can be prevented.

After having corrected and restricted the drive motor target torque TM* in this manner, the vehicle control system 51 determines the drive motor target torque TM* and sends it to the drive motor control unit 49. The drive motor control processing device of the drive motor control unit 49 performs the drive motor control process based on the drive motor target torque TM*.

Then, the generator control unit 47 judges whether or not the engine revolution number NE is the stopping revolution number NEth2 or below, and when the engine revolution number NE is equal to or smaller than the stopping revolution number NEth2, a shutdown control is started, switching with respect to the generator 16 is stopped, and the generator 16 is stopped (shut down).

Subsequently, the flowchart of FIG. 20 will be described.

At Step S16-1, it is determined whether or not the generator brake B is released. When the generator brake B is released, the procedure goes to Step S16-3 and, when it is not released, the procedure goes to Step S16-2.

At Step S16-2, the generator brake release control process is performed. At Step S16-3, fuel injection and ignition are stopped. At Step S164 The throttle opening θ is set to zero (%). At Step S16-5, the generator target revolution number NG* is determined. At Step S16-6, the generator revolution number control process is performed. At Step S16-7, the drive motor target torque calculation process is performed. At Step S16-8, the vibration restriction process is performed. At Step S16-9, the drive motor target torque restriction process is performed. At Step S16-10, the drive motor target torque TM* is determined. At Step S16-11, the drive motor control process is performed.

At Step S16-12, it is determined whether or not the engine revolution number NE is the stopping revolution number NEth2 or below. When the engine revolution number NE is the stopping revolution number NEth2 or below, the procedure goes to Step S16-13, and when the engine revolution number NE is higher than the stopping revolution number NEth2, the procedure goes back to Step S16-5. At Step S16-13, switching with respect to the generator 16 is stopped and returned.

The present invention is not limited to the above-described exemplary embodiment, and various modifications may be made based on the purpose of the invention, and are not excluded from the scope of the invention.

What is claimed is:

1. A drive control system for an electric vehicle comprising:
   a drive motor target torque calculation processing device for calculating a drive motor target torque representing a target torque of a drive motor; and
   a drive motor target torque restriction processing device that determines whether or not a parking mechanism provided engageably and disengageably with respect to a drive shaft so as to disable rotation of the drive shaft is in operation and, if the parking mechanism is in operation, restricts variations in the drive motor target torque, wherein the drive motor target torque restriction processing device is configured to restrict a rate of change of the drive motor target torque so as to be smaller than in a state in which the parking mechanism is not in operation.

2. A drive control system for an electric vehicle according to claim 1, wherein the drive motor target torque restriction processing device restricts a rate of change of the drive motor target torque.

3. A drive control system for an electric vehicle according to claim 1, further comprising a vibration restriction processing device that calculates a torque correction value for the drive motor target torque in order to restrict vibrations of a vehicle output shaft of the electric vehicle,
   wherein the drive motor target torque restriction processing device restricts the torque correction value.

4. A drive control system for an electric vehicle according to claim 3, further comprising a drive motor angular acceleration calculation processing device for calculating an angular acceleration of the drive motor,
   wherein the vibration restriction processing device calculates a torque correction value so that the angular acceleration becomes smaller than a predetermined value.

5. A drive control system for an electric vehicle according to claim 3, further comprising a plurality of detecting units disposed at predetermined positions on a plurality of shafts, kinds of the plurality of shafts comprise at least one of the vehicle output shaft, the drive shaft, a transmission shaft, and a counter shaft,
   wherein the vibration restriction processing device calculates the torque correction value so that a difference in revolution number detected by the respective detecting units becomes zero.

6. A drive control system for an electric vehicle according to claim 1, further comprising a vibration restriction processing device that calculates a torque correction value for the drive motor target torque in order to restrict vibrations of a vehicle output shaft of the electric vehicle,
   wherein the drive motor target torque restriction processing device restricts the torque correction value.

7. A drive control system for an electric vehicle according to claim 1, further comprising a vibration restriction processing device that calculates a torque correction value for the drive motor target torque in order to restrict vibrations of a vehicle output shaft of the electric vehicle,
   wherein the drive motor target torque restriction processing device restricts the torque correction value.

8. A drive control system for an electric vehicle according to claim 7, further comprising a drive motor angular acceleration calculation processing device for calculating an angular acceleration of the drive motor,
   wherein the vibration restriction processing device calculates a torque correction value so that the angular acceleration becomes smaller than a predetermined value.

9. A drive control system for an electric vehicle according to claim 7, further comprising a plurality of detecting units disposed at predetermined positions on a plurality of shafts, kinds of the plurality of shafts comprise at least one of the vehicle output shaft, the drive shaft, a transmission shaft, and a counter shaft,
   wherein the vibration restriction processing device calculates the torque correction value so that a difference in revolution number detected by the respective detecting units becomes zero.

10. A drive control system for an electric vehicle according to claim 1, further comprising a differential rotator having a first to a third differential elements, the first differential element being connected to a generator, the second differential element being connected to the drive motor, and the third differential element connected to an engine,
    wherein the drive motor target torque restriction processing device is configured so that a generator revolution number is controlled so that an engine revolution number meets an engine target revolution number, the drive motor target torque is calculated so that a vehicle-demanded torque required for causing an electric vehicle to travel based on an engine torque and a generator torque is generated, and variations in the drive motor target torque are restricted when the drive motor is driving.

11. A drive control system for an electric vehicle according to claim 10, further comprising a vibration restriction processing device that calculates a torque correction value for the drive motor target torque in order to restrict vibrations of a vehicle output shaft of the electric vehicle,
    wherein the drive motor target torque restriction processing device restricts the torque correction value.

12. A drive control system for an electric vehicle according to claim 11, further comprising a drive motor angular acceleration calculation processing device for calculating an angular acceleration of the drive motor, wherein the vibration restriction processing device calculates a torque correction value so that the angular acceleration becomes smaller than a predetermined value.

13. A drive control system for an electric vehicle according to claim 11, further comprising a plurality of detecting units disposed at predetermined positions on a plurality of shafts, kinds of the plurality of shafts comprises at least one of the vehicle output shaft, the drive shaft, a transmission shaft, and a counter shaft, wherein the vibration restriction processing device calculates the torque correction value so that a difference in revolution number detected by the respective detecting units becomes zero.

14. A drive control system for an electric vehicle according to claim 6, further comprising a plurality of detecting units disposed at predetermined positions on a plurality of shafts, kinds of the plurality of shafts comprise at least one of the vehicle output shaft, the drive shaft, a transmission shaft and a counter shaft, wherein the vibration restriction processing device calculates the torque correction value so that a difference in revolution number detected by the respective detecting units becomes zero.

15. A drive control system for an electric vehicle according to claim 6, further comprising a drive motor angular acceleration calculation processing device for calculating an angular acceleration of the drive motor, wherein the vibration restriction processing device calculates a torque correction value so that the angular acceleration becomes smaller than a predetermined value.

* * * * *